(12) United States Patent
Yamada et al.

(10) Patent No.: US 9,092,875 B2
(45) Date of Patent: Jul. 28, 2015

(54) MOTION ESTIMATION APPARATUS, DEPTH ESTIMATION APPARATUS, AND MOTION ESTIMATION METHOD

(75) Inventors: Hitoshi Yamada, Osaka (JP); Pongsak Lasang, Singapore (SG); Sheng Mei Shen, Singapore (SG)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 182 days.

(21) Appl. No.: 13/699,811

(22) PCT Filed: Apr. 10, 2012

(86) PCT No.: PCT/JP2012/002490
§ 371 (c)(1),
(2), (4) Date: Nov. 26, 2012

(87) PCT Pub. No.: WO2012/140869
PCT Pub. Date: Oct. 18, 2012

(65) Prior Publication Data
US 2013/0101177 A1    Apr. 25, 2013

(30) Foreign Application Priority Data
Apr. 12, 2011   (JP) ................. 2011-088676

(51) Int. Cl.
*G06T 7/00*     (2006.01)
*G06T 7/20*     (2006.01)

(52) U.S. Cl.
CPC ............. *G06T 7/2006* (2013.01); *G06T 7/0051* (2013.01); *G06T 7/0069* (2013.01);
(Continued)

(58) Field of Classification Search
CPC ... G06T 7/0051; G06T 7/0069; G06T 7/2006; G06T 7/2033; G06T 2207/10016; G06T 2207/20201
See application file for complete search history.

(56) References Cited

U.S. PATENT DOCUMENTS

| 6,128,071 A | 10/2000 | Melen |
| 6,987,530 B2 | 1/2006 | McConica |

(Continued)

FOREIGN PATENT DOCUMENTS

| JP | 2003-6657 | 1/2003 |
| JP | 2003-78812 | 3/2003 |
| JP | 2008-5355 | 1/2008 |

OTHER PUBLICATIONS

Maik et al., "Pattern Selective Image Fusion for Multi-focus Image Reconstruction", Computer Analysis of Images and Patterns Lecture Notes in Computer Science vol. 3691, 2005, 677-684.*

(Continued)

*Primary Examiner* — Katrina Fujita
(74) *Attorney, Agent, or Firm* — Wenderoth, Lind & Ponack, L.L.P.

(57) ABSTRACT

A motion estimation apparatus according to an aspect of the present invention is a motion estimation apparatus for estimating, using a set of multi-focus images which correspond to a single scene and have different focuses, motion for each of the first regions included in the scene, including: a cost value computing unit configured to compute, using the set of multi-focus images, for each of the first regions, a cost value indicating a difference between a blur amount of the first region and a standard blur amount determined for each of distances in a depth direction; and a motion estimation unit configured to estimate, using the cost value, the motion of the first region corresponding to the cost value.

18 Claims, 16 Drawing Sheets

(52) U.S. Cl.
CPC ..... *G06T 7/2033* (2013.01); *G06T 2207/10016* (2013.01); *G06T 2207/10148* (2013.01); *G06T 2207/20201* (2013.01)

(56) References Cited

U.S. PATENT DOCUMENTS

| | | | |
|---|---|---|---|
| 7,340,106 | B2 | 3/2008 | Kondo et al. |
| 7,616,254 | B2* | 11/2009 | Wong et al. ............ 348/349 |
| 8,405,742 | B2* | 3/2013 | Lim ................... 348/240.99 |
| 2003/0011717 | A1 | 1/2003 | McConica |
| 2004/0005084 | A1 | 1/2004 | Kondo et al. |
| 2004/0105573 | A1 | 6/2004 | Neumann et al. |
| 2005/0243178 | A1 | 11/2005 | McConica |
| 2007/0019883 | A1* | 1/2007 | Wong et al. ............. 382/276 |
| 2007/0104275 | A1* | 5/2007 | Heyward ............. 375/240.16 |
| 2008/0037869 | A1* | 2/2008 | Zhou ..................... 382/173 |
| 2008/0080852 | A1* | 4/2008 | Chen et al. ............. 396/324 |

OTHER PUBLICATIONS

Yokota et al., "High-speed sensing system for depth estimation based on depth-from-focus by using smart imager", Circuits and Systems, 2005. ISCAS 2005. IEEE International Symposium on, vol. 1, 564-567.*

Zhang et al., "Image registration for multifocus image fusion", 2001, Proc. SPIE 4396, Battlespace Digitization and Network-Centric Warfare, 279-290.*

International Search Report issued May 22, 2012 in corresponding International Application No. PCT/JP2012/002490.

John Ens et al., "An Investigation of Methods for Determining Depth from Focus", IEEE Transactions on Pattern Analysis and Machine Intelligence, vol. 15, No. 2, Feb. 1993, pp. 97-108.

Murali Subbarao et al., "Accurate Recovery of Three-Dimensional Shape from Image Focus", IEEE Transactions on Pattern Analysis and Machine Intelligence, vol. 17, No. 3, Mar. 1995, pp. 266-274.

Murali Subbarao et al., "Depth from Defocus: A Spatial Domain Approach", International Journal of Computer Vision, vol. 13, No. 3, Dec. 1994, pp. 1-33.

Subhasis Chaudhuri et al., "Depth From Defocus: A Real Aperture Imaging Approach", Springer, Mar. 26, 1999.

Bruce D. Lucas et al., "An Iterative Image Registration Technique with an Application to Stereo Vision", Proceedings of the 7th International Joint Conference on Artificial Intelligence (IJCAI '81), Apr. 1981, pp. 674-679.

Carlo Tomasi et al., "Shape and Motion from Image Streams: a Factorization Method—Part 3 Detection and Tracking of Point Features", Carnegie Mellon University Technical Report CMU-CS-91-132, Apr. 1991, pp. 1-20.

* cited by examiner

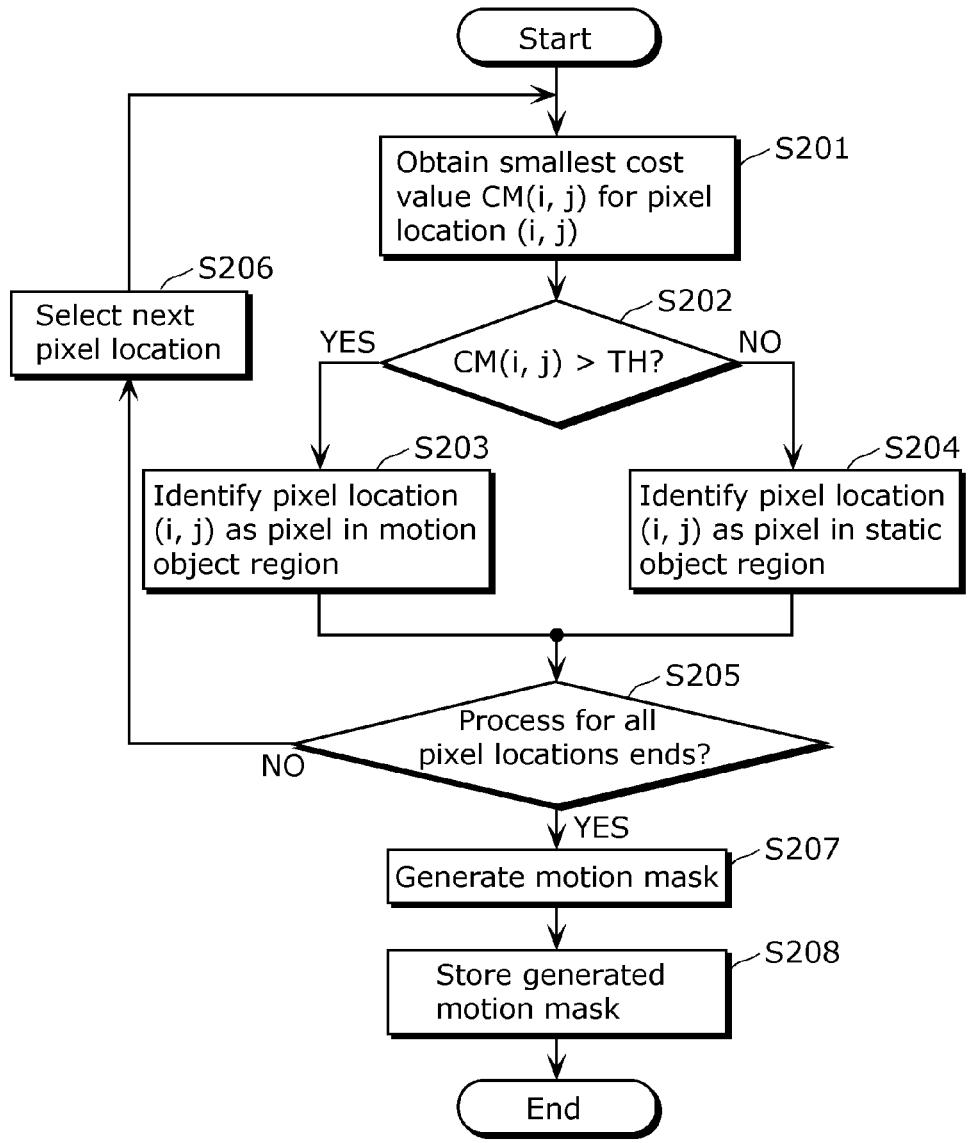
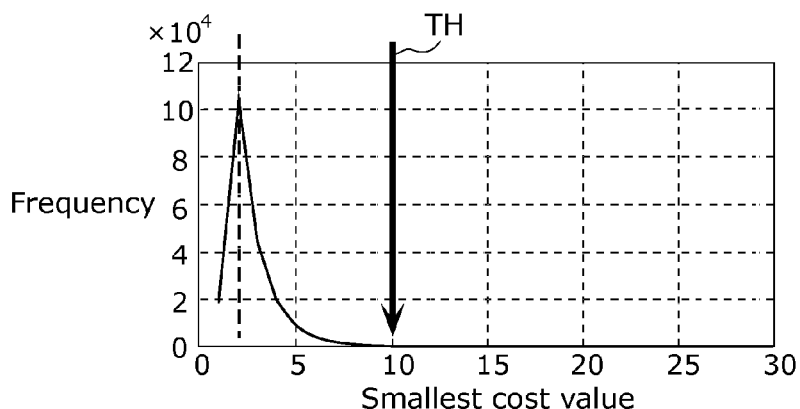

MOTION ESTIMATION APPARATUS, DEPTH ESTIMATION APPARATUS, AND MOTION ESTIMATION METHOD

TECHNICAL FIELD

The present invention relates to motion estimation apparatuses, depth estimation apparatuses, and motion estimation methods, and particularly relates to a motion estimation apparatus for estimating the motion of a single scene from a set of multi-focus images having different focuses.

BACKGROUND ART

A depth map is an image or image channel that contains information relating to the distance to the surfaces of scene objects from a viewpoint. The depth map is used in many applications such as automotive sensing, medical imaging, and three-dimensional (3D) applications. Generally, a depth map of a scene can be obtained from two approaches: active approach and passive approach.

In active approach, the coded signal (that is, structured light, infrared (IR) signal, laser, or audio signal) is projected or illuminated into the scene and the receiver or the detector receives or captures the projected signal. The depth map is then calculated or estimated based on the difference between the projected signal and the received signal. Examples of the active approach are time-of-flight (TOF) sensor, Light Detection and Ranging (LiDAR), structured light pattern, and ultrasonic range sensor.

In passive approach, the depth map can be estimated from the captured images alone without the need of projecting the signal into the scene. Therefore, passive approach can be realized at a low cost and can be achieved by using the conventional single digital camera.

Several passive depth estimation techniques have been disclosed (for example, refer to Non Patent Literature 1, Non Patent Literature 2, Non Patent Literature 3, and Non Patent Literature 4). These can be classified into two mainstreams: the depth from focus (DFF) method and the depth from defocus (DFD) method. Both the DFF method and the DFD method require multiple input images each of which has a difference focus, for depth estimation. In the DFF method, several images of a single scene are captured at different focus points. Then, the focus or the sharpness (contrast) in each captured image is measured. The depth map of the scene is finally obtained by detecting the maximum sharpness in the images and the corresponding focus setting. In the DFD method, fewer multi-focus images (at least two images) can be used. The depth map can be estimated by a blur amount between pixels in the multi-focus images.

Patent Literature 1 discloses a single-lens camera system for recording depth information of a three-dimensional scene. FIG. 1 shows the system for capturing multi-focus images according to Patent Literature 1. The system moves the lens in the direction of the central axis of the lens to capture a subject (an object) at various distances in front of the lens system. The object passes in and out of focus on the image sensor. With a known focal length of the lens system, the depth map (the distance between the lens system and the object) is computed based on the distance between the lens system and the image sensor when the object is in-focus.

Patent Literature 2 discloses a method for creating a depth map using an all-in-focus image and two-dimensional scale space matching. In the method, multi-images of a single scene are captured. Then, an all-in-focus image is constructed from the captured multi-focus image. The scale space blur images are then generated from the all-in-focus image. Finally, the depth map is created by matching the blur amount in the capture image and the blur amount in the generated scale space blur images.

CITATION LIST

Patent Literature

[PTL 1]
U.S. Pat. No. 6,128,071
[PTL 2]
U.S. Patent Application Publication No. 2007/0019883

Non Patent Literature

[NPL 1]
John Ens and Peter Lawrence, "An Investigation of Methods for Determining Depth from Focus", IEEE Transactions on Pattern Analysis and Machine Intelligence, vol. 15, no. 2, February 1993.
[NPL 2]
Murali Subbarao and Tae Choi, "Accurate Recovery of Three-Dimensional Shape from Image Focus", IEEE Transactions on Pattern Analysis and Machine Intelligence, vol. 17, no. 3, March 1995.
[NPL 3]
Murali Subbarao and Gopal Surya "Depth from Defocus: A Spatial Domain Approach", International Journal of Computer Vision, vol. 13, no. 3, December 1994.
[NPL 4]
Subhasis Chaudhuri and A. N. Rajagopalan, "Depth from Defocus: A Real Aperture Imaging Approach", Springer-Verlag New York, Inc., 1999.
[NPL 5]
B. D. Lucas and T. Kanade, "An iterative image registration technique with an application to stereo vision", Proceedings of 7th International Joint Conference on Artificial Intelligence, 1981.
[NPL 6]
C. Tomasi and T. Kadane, "Shape and motion from image streams: a factorization method-3: Detection and Tracking of Point Features", Technical Report CMU-CS-91-132, Carnegie Mellon University, Pittsburgh, Pa., April 1991.

SUMMARY OF INVENTION

Technical Problem

Moreover, in the DFF method and the DFD method, it is believed that it is possible to perform various processes by estimating the motion of the object and by using the motion of the estimated object motion. Moreover, as the method for estimating the object in the DFF method and the DFD method, it is hoped that an easier motion estimation method is realized.

Therefore, the present invention has an object to provide a motion estimation apparatus and a motion estimation method which easily estimate the motion of the object.

Solution to Problem

In order to attain the above mentioned goal, the motion estimation apparatus according to an aspect of the present invention is a motion estimation apparatus for estimating, using a set of multi-focus images which correspond to a single scene and have different focuses, motion for each of first regions included in the scene, the motion estimation apparatus comprising: a cost value computing unit configured to compute, using the set of multi-focus images, for each of the first regions, a cost value indicating a difference between a blur amount corresponding to the first region and a standard blur amount determined for each of distances in a depth direction; and a motion estimation unit configured to estimate, based on the cost value, the motion of the first region corresponding to the cost value.

Advantageous Effects of Invention

The present invention can provide a motion estimation apparatus and a motion estimation method which can easily estimate the motion of the object.

BRIEF DESCRIPTION OF DRAWINGS

FIG. 1 is an illustration of a conventional system for capturing multi-focus images.
FIG. 2 is a block diagram of an imaging apparatus including a depth estimation apparatus according to Embodiment 1 of the present invention.
FIG. 3 is a block diagram of a depth estimation apparatus according to Embodiment 1 of the present invention.
FIG. 4 is a diagram showing an example of a set of multi-focus images according to Embodiment 1 of the present invention.
FIG. 5 is a flowchart of the depth estimation process according to Embodiment 1 of the present invention.
[FIG. 6]
FIG. 6 is a flowchart of the motion estimation process according to Embodiment 1 of the present invention.
[FIG. 7A]
FIG. 7A is a diagram showing an example of the distribution of smallest cost values according to Embodiment 1 of the present invention.
FIG. 7B is a diagram showing an example of the distribution of smallest cost values according to Embodiment 1 of the present invention.
FIG. 7C is a diagram showing an example of the distribution of smallest cost values according to Embodiment 1 of the present invention.
FIG. 8 is a flowchart of the feature tracking process according to Embodiment 1 of the present invention.
FIG. 9 is a flowchart of the depth map compensation process according to Embodiment 1 of the present invention.
FIG. 10A is a diagram showing an example of an image of a static object according to Embodiment 1 of the present invention.
FIG. 10B is a diagram showing an example of an image of a static object according to Embodiment 1 of the present invention.
FIG. 10C is a diagram showing an example of an image of a static object according to Embodiment 1 of the present invention.
FIG. 10D is a diagram showing an example of a depth map of a static object according to Embodiment 1 of the present invention.
FIG. 11A is a diagram showing an example of an image including a motion object according to Embodiment 1 of the present invention.
FIG. 11B is a diagram showing an example of an image including a motion object according to Embodiment 1 of the present invention.
FIG. 11C is a diagram showing an example of an image including a motion object according to Embodiment 1 of the present invention.
FIG. 11D is a diagram showing an example of a depth map of a motion object according to Embodiment 1 of the present invention.
FIG. 12 is a diagram showing the depth compensation process using motion estimation and feature tracking according to Embodiment 1 of the present invention.
FIG. 13 is a diagram showing improvement in depth accuracy of the depth map according to Embodiment 1 of the present invention.
FIG. 14 is a flowchart of the motion estimation process according to a modification of Embodiment 1 of the present invention.
FIG. 15 is a block diagram of a depth estimation apparatus according to Embodiment 2 of the present invention.
FIG. 16 is a block diagram of a depth estimation apparatus according to a modification of Embodiment 2 of the present invention.
FIG. 17 is a block diagram of an imaging apparatus according to Embodiment 3 of the present invention.

Figure 1:
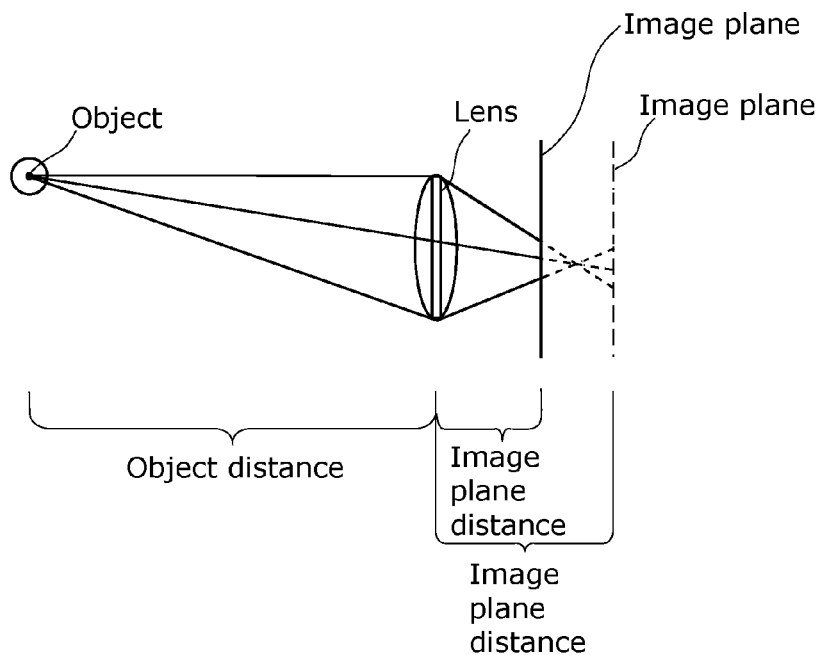
[FIG. 1]

DESCRIPTION OF EMBODIMENTS (Underlying Knowledge Forming Basis of the Present Invention)

The inventors have found the following problem.

The systems and methods according to Patent Literature 1, Patent Literature 2, and other known methods as described above are to be used for still image capture with a static object only. They are not suitable for capturing a scene with moving object or movie capturing. This is because when the object moves during image capturing, the same object will be located at different pixel locations in the captured multi-focus images, which makes them fail to measure the focus or match the blurriness of the object correctly. Therefore, the accuracy of the estimated depth map from the moving object is degraded.

Therefore, embodiments of the present invention provide methods and apparatuses for depth estimation from multi-focus images which are applicable to both still images and movie captures, and improve depth accuracy of a moving object while generating accurate depth information for a still object.

Moreover, the embodiments provide a motion estimation apparatus and a motion estimation method which can easily estimate the motion of the object.

The motion estimation apparatus according to an aspect of the present invention is a motion estimation apparatus for estimating, using a set of multi-focus images which correspond to a single scene and have different focuses, motion for each of first regions included in the scene, the motion estimation apparatus comprising: a cost value computing unit configured to compute, using the set of multi-focus images, for each of the first regions, a cost value indicating a difference between a blur amount corresponding to the first region and a standard blur amount determined for each of distances in a depth direction; and a motion estimation unit configured to estimate, based on the cost value, the motion of the first region corresponding to the cost value.

With this configuration, the motion estimation apparatus according to an aspect of the present invention can estimate the motion of the object using cost values computed in the DFF method and the DFD method. In this way, the motion estimation apparatus diverts the cost values originally used in the DFF method and the DFD method to an estimation process for the motion of the object. Therefore, the motion estimation apparatus can easily estimate the motion of the object since the computational complexity for the motion estimation process can be reduced.

Moreover, the cost value computing unit may be configured to compute, for each of the first regions, a smallest cost value that is a smallest among cost values including the cost value each of which is determined for one of the distances in the depth direction, and the motion estimation unit may be configured to estimate, based on the smallest cost value, the motion of the first region corresponding to the smallest cost value.

With this configuration, the motion estimation apparatus according to an aspect of the present invention can estimate the motion of the object using the smallest cost value calculated in the DFF method and the DFD method.

Moreover, the motion estimation unit is configured to: determine that the first region corresponding to the smallest cost value is a motion object region that is in motion when the smallest cost value is greater than a threshold; and determine that the first region corresponding to the smallest cost value is a static object region that is not in motion when the smallest cost value is smaller than the threshold.

With this configuration, the motion estimation apparatus according to an aspect of the present invention can determine, by an easy process, whether each of the first regions belongs to a motion region or a non-motion region.

Moreover, the threshold may be a predetermined fixed value.

Moreover, the depth map estimation apparatus according to an aspect of the present invention is a depth estimation apparatus for generating, for each of scenes, a depth map, using a set of multi-focus images which correspond to a single scene and have different focuses, the depth map showing a depth for each of second regions included in the scene, the depth estimation apparatus comprising: a depth map generation unit configured to generate, for each of the scenes, an initial depth map that is a depth map of the scene, using the set of multi-focus images corresponding to the scene; the motion estimation apparatus which estimates, for each of the scenes, motion for each of the first regions included in the scene; and a depth compensation unit configured to compensate depth information of the motion object region included in the initial depth map of a scene to be processed, with depth information of the static object region included in another scene and corresponding to the motion object region.

With this configuration, the depth map estimation apparatus according to an aspect of the present invention compensates the depth information of the motion object region having low accuracy with the depth information of the static object region having high accuracy. With this, the depth map estimation apparatus can generate a depth map with high accuracy.

Moreover, the depth compensation unit may be configured to copy the depth information of the static object region to the depth information of the motion object region.

Moreover, the motion compensation unit may be configured to compensate the depth information of the motion object region included in the initial depth map of the scene to be processed, with depth information of the static object region included in a scene which is temporally closest to the scene to be processed, among other scenes including the static object region corresponding to the motion object region.

With this configuration, the depth map estimation apparatus according to an aspect of the present invention can generate a high accuracy depth map by using the depth information of a temporally close scene for the compensation process.

Moreover, the depth compensation unit may be configured to compensate, for each pixel, the depth information of the motion object region included in the initial depth map of the scene to be processed, with the depth information of the static object region included in the other scene and corresponding to the motion object region.

With this configuration, the depth map estimation apparatus according to an aspect of the present invention can improve the accuracy of the depth map.

Moreover, the depth compensation unit may be configured to compensate, for each region including pixels, the depth information of the motion object region included in the initial depth map of the scene to be processed, with the depth information of the static object region included in the other scene and corresponding to the motion object region.

With this configuration, the depth map estimation apparatus can reduce the computational complexity for the depth map estimation process.

Moreover, the depth estimation apparatus may further comprise a feature tracking unit configured to track an object between scenes, to generate tracked object information showing a same object in the scenes, wherein the depth compensation unit may be configured to identify, using the tracked object information, the static object region included in the other scene and corresponding to the motion object region.

With this configuration, the depth map estimation apparatus according to an aspect of the present invention can easily identify the same object between the images.

Moreover, the feature tracking unit may be configured to: compute a set of first object features in at least one first image that is included in a set of first multi-focus images; compute a set of second object features in at least one second image that is included in a set of second multi-focus images and has a focus identical to a focus of the first image; and generate the tracked object information by matching the set of first object features and the set of second object features.

Moreover, the depth estimation apparatus may further comprise a motion compensation unit configured to compute a motion vector of the motion object region, using the set of multi-focus images, wherein the depth map generation unit may be configured to perform motion compensation on the set of multi-focus images using the motion vector, and generate the initial depth map using a set of multi-focus images resulting from the motion compensation.

With this configuration, the depth map estimation apparatus according to an aspect of the present invention can improve the accuracy of the depth map with the motion compensation. Moreover, the depth map estimation apparatus can reduce computational complexity for the motion compensation process by performing motion compensation on the motion object region estimated by the motion estimation apparatus.

Moreover, the depth map estimation apparatus according to an aspect of the present invention is a depth estimation apparatus for generating, for each of scenes, a depth map, using a set of multi-focus images which correspond to a single scene and have different focuses, the depth map showing a depth for each of second regions included in the scene, the depth estimation apparatus comprising: the motion estimation apparatus which estimates, for each of the scenes, motion for each of first regions included in the scene; a motion compensation unit configured to compute a motion vector of the motion object region, using the set of multi-focus images; and a depth map generation unit configured to perform motion compensation on the set of multi-focus images using the motion vector, and generate a depth map of a corresponding scene using a set of multi-focus images resulting from the motion compensation.

With this configuration, the depth map estimation apparatus according to an aspect of the present invention can improve the accuracy of the depth map with the motion compensation. Moreover, the depth map estimation apparatus can reduce computational complexity for the motion compensation process by performing motion compensation on the motion object region estimated by the motion estimation apparatus.

It should be noted that the present invention can be implemented not only as such a motion estimation apparatus and such a depth estimation apparatus but also as a motion estimation method or a depth estimation method both of which include the steps included in the motion estimation apparatus or the depth estimation apparatus, and as a program for causing a computer to execute the steps. Moreover, it goes without saying that such a program can be distributed via a non-transitory computer-readable recording medium such as CD-ROM, and a transmission medium such as the Internet.

Furthermore, the present invention can be implemented as a Large Scale Integration (LSI) which performs a part or all of the functions of the motion estimation apparatus and the depth estimation apparatus. The present invention can also be implemented as an imaging apparatus including the motion estimation apparatus or the depth estimation apparatus.

It should be noted that a general or specific embodiment may be implemented as a system, a method, an integrated circuit, a computer program, or a recording medium. It may be also implemented as any combination of a system, a method, an integrated circuit, a computer program, and a recording medium.

The following will describe the motion estimation apparatus and the depth estimation apparatus according to an aspect of the present invention with reference to the drawings.

It should be noted that each of the embodiments to be described later is an example of the present invention. The numeral values, shapes, materials, constituent elements, arrangement and connection of the constituent elements, steps, and an order of the steps to be shown in the following embodiments are mere examples, and therefore are not intended to limit the present invention. Moreover, among the constituent elements in the following embodiments, the constituent elements that are not recited in any one of the independent claims defining the most generic part of the present invention will be described as optional constituent elements.

[Embodiment 1]

The depth estimation apparatus according to the present embodiment detects a motion object in a set of multi-focus images for identifying the static object region with potentially high depth accuracy and the motion object region with potentially low depth accuracy. The depth estimation apparatus transfers (fuses) the high accuracy depth information in the static object region from frames to the destination depth map, and then the accuracy of the destination depth map that initially has low depth accuracy due to the moving object is improved. Therefore, the depth map estimation apparatus can realize high accuracy depth map in both the motion object region and static object region.

First, a configuration of the imaging apparatus including the depth estimation apparatus according to the present embodiment will be described.

Figure 2:
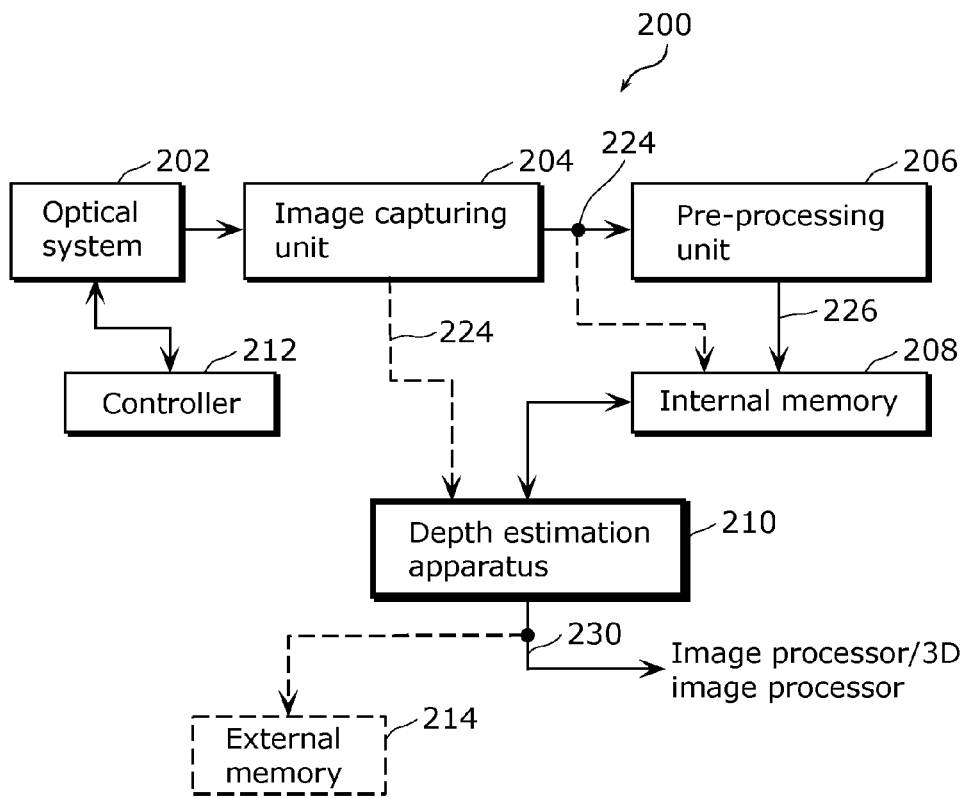
[FIG. 2]

FIG. 2 is a block diagram of an imaging apparatus 200 including a depth estimation apparatus 210 according to the present embodiment. The imaging apparatus 200 includes an optical system 202, an image capturing unit 204, a pre-processing unit 206, an internal memory 208, a depth estimation apparatus 210, a controller 212, and an external memory 214.

The image capturing unit 204 captures a set of multi-focus images 224 which have mutually different focuses.

The pre-processing unit 206 generates a set of pre-processed multi-focus images 226 by performing pre-processing on the set of raw multi-focus images 224 that are captured. Moreover, the set of pre-processed multi-focus images 226 that is output from the pre-processing unit 206 is stored in the internal memory 208. It should be noted that the set of raw multi-focus images 224 may be stored in the internal memory 208.

The depth estimation apparatus 210 obtains the set of pre-processed multi-focus images 226 stored in the internal memory 208. It should be noted that the depth estimation apparatus 210 may directly obtain the set of raw multi-focus images 224 generated by the image capturing unit 204 and may obtain the set of multi-focus images 224 stored in the internal memory 208. It should be noted that description will be made about the case where the set of multi-focus images 226 is inputted to the depth estimation apparatus 210.

The depth estimation apparatus 210 estimates a depth map 230 using the set of multi-focus images 226. It should be noted that the depth estimation apparatus 210 may store, in the internal memory 208, the intermediate information generated in the estimation process for the depth map 230. Then, the estimated depth map 230 is outputted to an image processor or a 3D image processor for the subsequent processing. Moreover, the imaging apparatus 200 may store the depth map 230 in the external memory 214 for later use.

Figure 3:
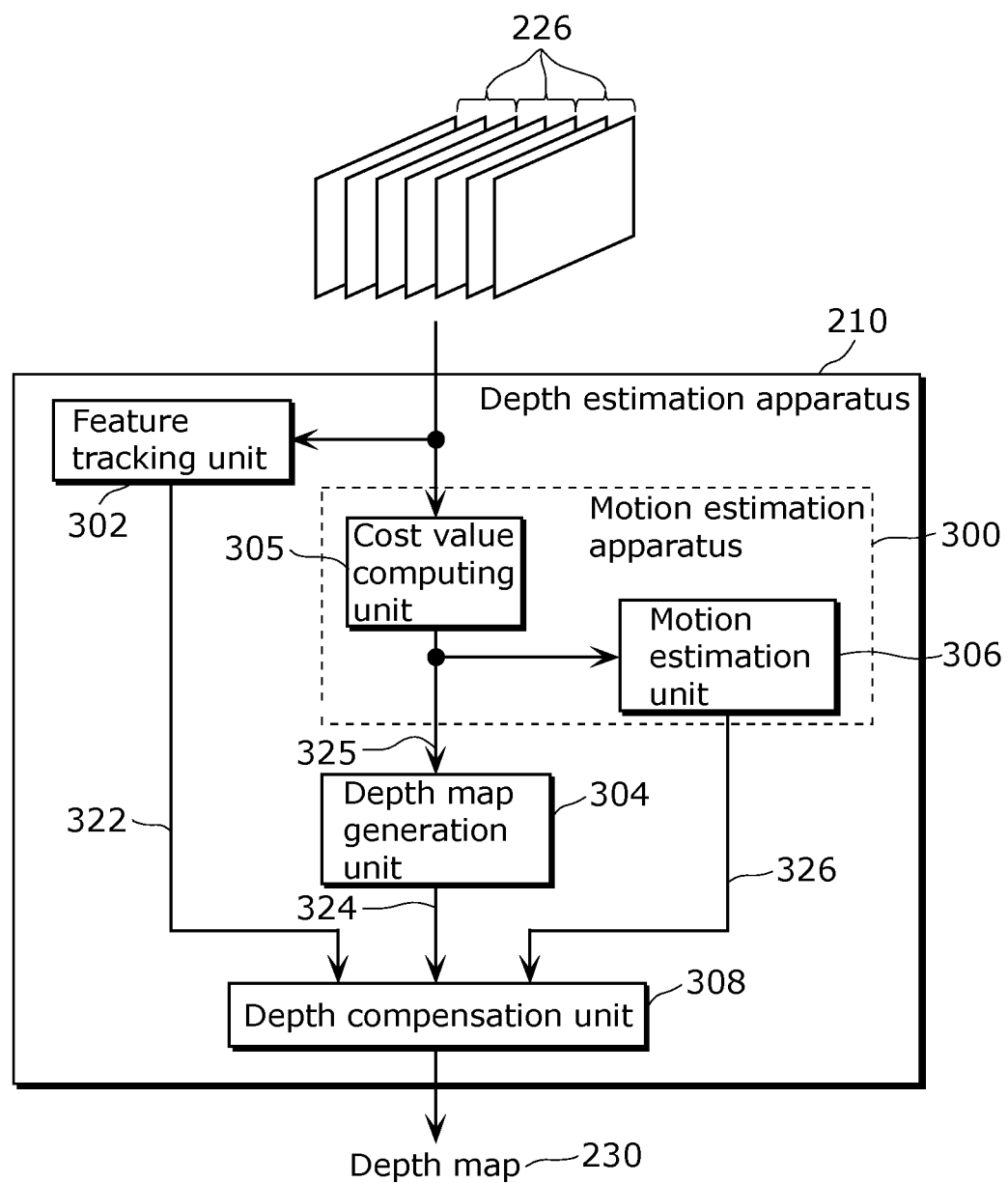
[FIG. 3]

FIG. 3 is a block diagram of the depth estimation apparatus 210. A plurality of sets of multi-focus images 226 are inputted to the depth estimation apparatus 210. Here, a set of multi-focus images 226 correspond to one of the scenes. Then, the depth estimation apparatus 210 generates a depth map 230 for each of the scenes. Moreover, the depth map 230 shows a depth for each of the pixel locations included in the single scene.

Figure 4:
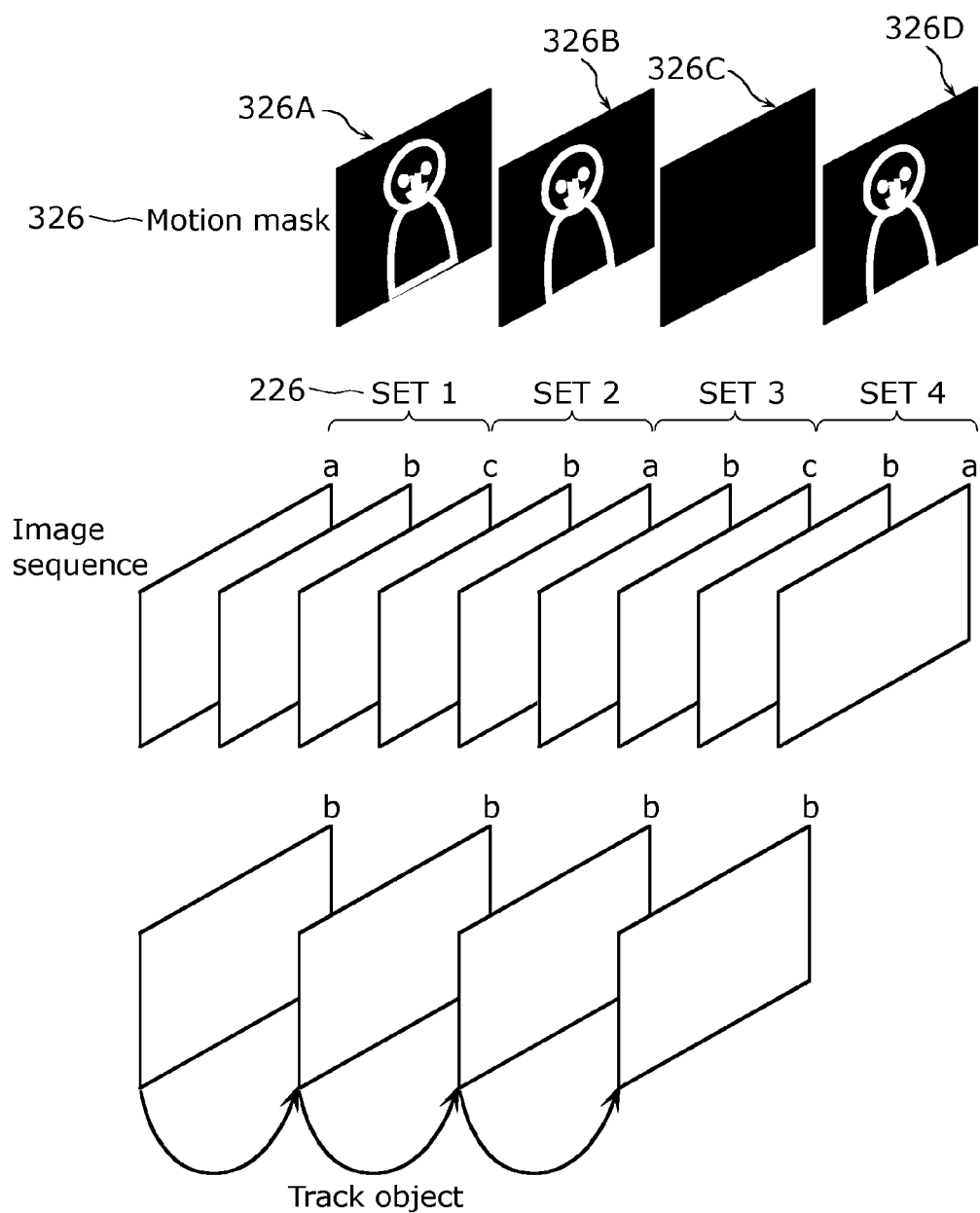
[FIG. 4]

FIG. 4 is a diagram showing an example of an image sequence, including the sets of multi-focus images 226, which is inputted to the depth estimation apparatus 210. As shown in FIG. 4, the image sequence, for example, includes three kinds of images: a, b, and c having different focal positions. The image a, the image b, and the image c are captured at different time and different focal positions. Moreover, the image sequence includes the sets of multi-focus images 226 (SET 1, SET 2, SET 3, and SET 4). Each of the sets of multi-focus images 226 includes the sequence of image a, image b, and image c or the sequence of image c, image b, and image a. It should be noted that part of the image included in a set of certain multi-focus images 226 and an adjacent set of multi-focus images 226 are shared (for example, the image c is shared by SET 1 and SET 2). However, it is not necessary for the sets of mutually adjacent multi-focus images 226 to share the part of the image included in the set of certain multi-focus images 226. Moreover, three images having different focuses are included in each of the sets of multi-focus images 226. However, at least two images having different focuses may be included in each of the sets of multi-focus images 226.

Moreover, typically, the image sequence is images obtained by moving picture recording or continuous image capture of still images. Moreover, the set of multi-focus images 226 is a plurality of images which capture almost the same object (scene) and have different focuses. Typically, the set of multi-focus images 226 is a plurality of images obtained by continuous image capture of the same object.

The depth estimation apparatus 210 includes a motion estimation apparatus 300, a feature tracking unit 302, a depth map generation unit 304, and a depth compensation unit 308.

The feature tracking unit 302 tracks the object between the plurality of sets of multi-focus images 226 and generates tracked object information 322 showing the same object in a plurality of scenes.

The motion estimation apparatus 300 estimates the motion for each of the pixel locations included in a single scene by using a set of multi-focus images 226. The motion estimation apparatus 300 includes a cost value computing unit 305 and a motion estimation unit 306.

The cost value computing unit 305 computes a set of cost values for each of the pixel locations included in a single scene by using a set of multi-focus images 226. The cost value computing unit 305 selects a smallest cost value 325 having a smallest value from the set of cost values for each of the pixel locations. Here, the cost value is a value indicating the difference between a blur amount in each of the pixel locations and a standard blur amount determined for each of the distances in a depth direction. In other words, when the cost value is small, the blur amount is small. It should be noted that details of the cost value computing process will be described later.

The depth map generation unit 304 generates, for each of the scenes, an initial depth map 324 which is a depth map of the scene, using the set of multi-focus images 226 corresponding to the scene. More specifically, the depth map generation unit 304 generates the initial depth map 324 by estimating the depth map of a single scene, using the smallest cost value 325 for each of the pixel locations that is computed by the cost value computing unit 305.

The motion estimation unit 306 estimates the motion of the pixel location corresponding to the cost value, using the cost value computed by the cost value computing unit 305. More specifically, the motion estimation unit 306 uses the smallest cost value 325 of the pixel position, and identifies whether the current pixel location belongs to the motion object region having motion (large motion) or to the static object region having no motion (small motion). The motion estimation unit 306 generates a motion mask 326 showing whether each of the pixel locations in a single scene belongs to the motion object region or static object region. It should be noted that in the case of video recording, the depth estimation apparatus 210 generates the initial depth map 324 and the motion mask 326 for all the sets of multi-focus images 226.

The depth compensation unit 308 obtains the tracked object information 322, the initial depth map 324 and the motion mask 326 of the set of current multi-focus images (to be processed), and the initial depth map 324 and the motion mask 326 of the set of previous multi-focus images. The depth compensation unit 308 compensates the depth information of the motion object region included in the initial depth map 324 of the current scene to be processed, with the depth information of the static object region which is included in another scene and corresponds to the motion object region. More specifically, the depth compensation unit 308 generates the depth map 230, based on the tracked object information 322 and the motion mask 326, by transferring the accurate depth information of the object which is included in the previous initial depth map 324 and identified as static to the depth information of the same object which is identified as moving in the current initial depth map 324. Moreover, the depth compensation unit 308 uses the tracked object information 322 to identify the static object region which corresponds to the motion object region in the scene to be processed and is included in another scene.

Therefore, the depth accuracy of the motion object in the depth map 230 is significantly improved. This is because the high accuracy depth information in the previous initial depth map is used to improve the low accuracy depth information in the current initial depth map.

The cost value computing unit 305 and the depth map generation unit 304 are implemented in the following example. First, the cost value computing unit 305 generates an all-in-focus (AIF) image using at least one image of the set of multi-focus images 226. Second, the cost value computing unit 305 generates a set of blurred images using the AIF image and the set of Point Spread Function data. Here, the PSF data represents how the point light source spreads out when observed at a specific distance with specific image parameters. The PSF is relating to the distance (depth) of the object in the scene. The cost value computing unit 305 calculates the set of cost values for each of the pixel locations included in a single scene, using the set of multi-focus images 226 and the set of blurred images. Here, the set of cost values is a set of a plurality of cost values each of which corresponds to each of the distances (depths). Finally, the cost value computing unit 305 determines the smallest cost value 325 having the smallest value among the cost values included in the set of cost values. The depth map generation unit 304 generates the initial depth map 324 which determines that the distance corresponding to the PSF used for generating the blurred image with the smallest cost value is the depth information of the pixel location.

The above described process is called Advanced-Depth from Defocus (A-DFD). In the process, the defocus blur is matched on a pixel-by-pixel basis between the generated blurred image and the captured input image. When the object is in motion, the location of the object between images included in the set of multi-focus images 226 is slightly moved. With this, the pixel blur matching is incorrect. Therefore, the estimated depth can have a depth error. Conversely, the depth estimation apparatus 210 according to the present embodiment identifies, by detecting the motion object in the set of multi-focus images 226, the region with high depth accuracy (static object region) and the region with low depth accuracy (motion object region). Based on this information, the depth estimation apparatus 210 can improve the region with low depth accuracy in the current depth map, using the region with high depth accuracy in the previous depth map.

The above described depth estimation process is used by way of example purpose only. It does not limit the scope or spirit of the present invention. Other known depth estimation methods such as conventional DFD and DFF may also be used.

The depth estimation apparatus 210 and other processing units are typically implemented in the form of Integrated Circuits (IC), Application-Specific Integrated Circuits (ASIC), Large Scale Integrated circuits (LSI), or Digital Signal Processor (DSP), or achieved by equipment including any CPU processor such as ARM or Personal Computer (PC). Each of the processing units can be in many single-function LSIs, or can be in one integrated LSI. The name used here is LSI, but it may also be called IC, system LSI, super LSI, or ultra LSI depending on the degree of integration. Moreover, ways to achieve integration may be achieved by not only LSI but also special circuit or general purpose processor. This includes a specialized microprocessor such as DSP that can be directed by a program instruction. Field Programmable Gate Array (FPGA) that can be programmed after manufacturing LSI or reconfigurable processor that can reconfigure the connection or configuration of LSI can be used for the same purpose. In the future, with the advancement in manufacturing and process technology, a brand-new technology may replace LSI. The integration can be performed by using the technology.

In the implementation, the depth estimation apparatus 210 may be embedded into the image capturing apparatus such as a digital still camera and a movie camera. Moreover, the depth estimation apparatus 210 may be implemented in a standalone device to work with the image capturing system such as a professional image capturing system. The implementation of the depth estimation apparatus 210 is also possible in other types of device and the scope of the present invention is not intended to be limited.

Figure 5:
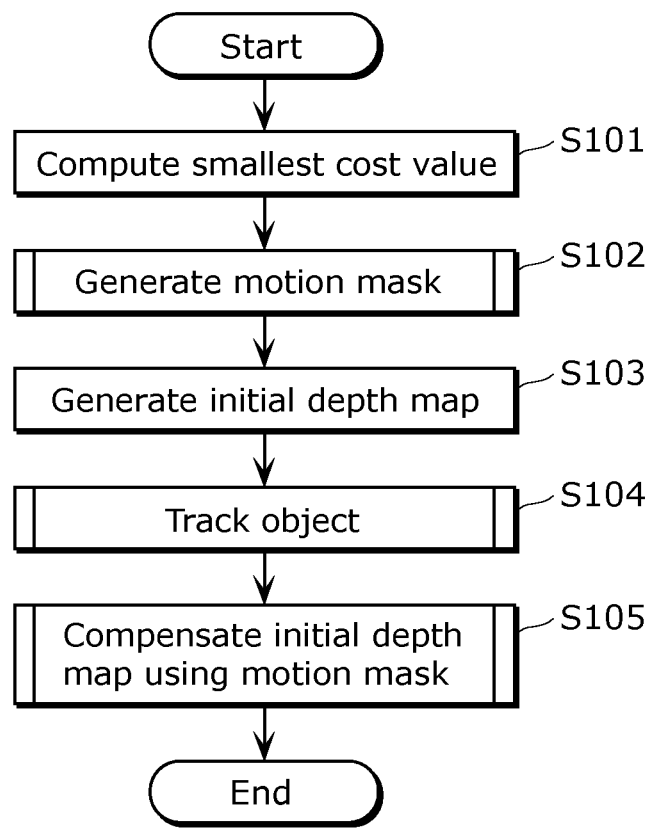
[FIG. 5]

The following will describe the flow of operation of the above described depth estimation apparatus 210. FIG. 5 is a flowchart of the depth estimation process for a single scene by the depth estimation apparatus 210.

First, the cost value computing unit 305 computes the smallest cost value 325 using the set of multi-focus images 226, according to the above described method (S101). Next, the motion estimation unit 306 generates a motion mask using the smallest cost value 325 (S102). Moreover, the depth map generation unit 304 generates the initial depth map 324 using the smallest cost value 325 according to the above described method (S103). Moreover, the feature tracking unit 302 generates the tracked object information 322 by tracking the object between the scenes (S104). Finally, the depth compensation unit 308 generates the depth map 230 by compensation the initial depth map 324, using the motion mask 326 and the tracked object information 322.

FIG. 6 is a flowchart showing process steps of the motion mask generation process by the motion estimation unit 306 (S102). First, the smallest cost value CM (i, j) for the pixel location (i, j) computed by the motion estimation unit 306 and the cost value computing unit 305 is obtained (S201). Next, the motion estimation unit 306 determines whether or not CM (i, j) is greater than a threshold TH (S202). For example, the threshold is a predetermined fixed value.

When CM (i, j) is greater than the threshold TH (YES in S202), the motion estimation unit 306 identifies the pixel location (i, j) as a pixel in the motion object region (S203). Meanwhile, when CM (i, j) is not greater than the threshold TH (NO in S202), the motion estimation apparatus 300 identifies the pixel location (i, j) as a pixel in the static object region (S204).

When the process of Steps S201 to S204 is not completed for all the pixel locations (NO in S205), the motion estimation unit 306 selects the next pixel location (S206) and the process of Step S201 and the following steps is performed on the selected pixel. Moreover, when the process is completed for all the pixel locations (YES in S205), the motion estimation unit 306 generates the motion mask 326 showing whether each of the pixel locations is a motion object region or a static object region (S207). Finally, the motion estimation unit 306 stores the generated motion mask 326 in a memory (not illustrated) (S208).

Here, since the object is moving, the smallest cost value is great when the pixel blur matching is incorrect. Therefore, depending on whether or not the smallest cost value is greater than or equal to the threshold TH as described above, it can be determined whether or not each of the pixel locations is moving.

It should be noted that the threshold TH may be predefined and stored in the register or memory. Moreover, the threshold TH may also be dynamically computed according to the scene objects by analyzing the distribution of the smallest cost values.

Figure 7B:
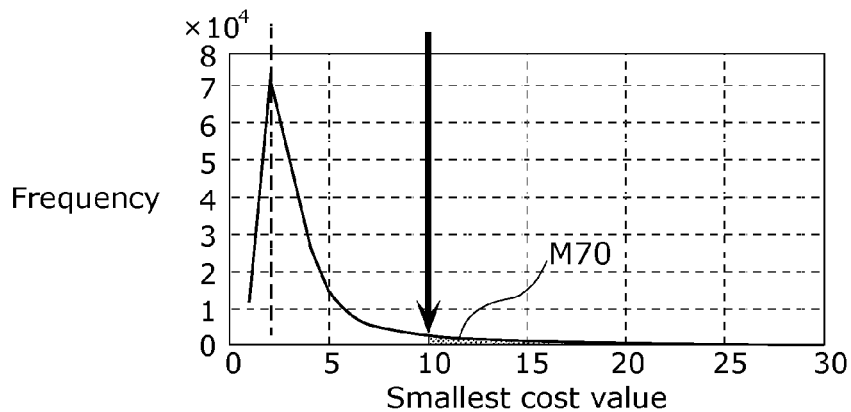
[FIG. 7B]
Figure 7C:
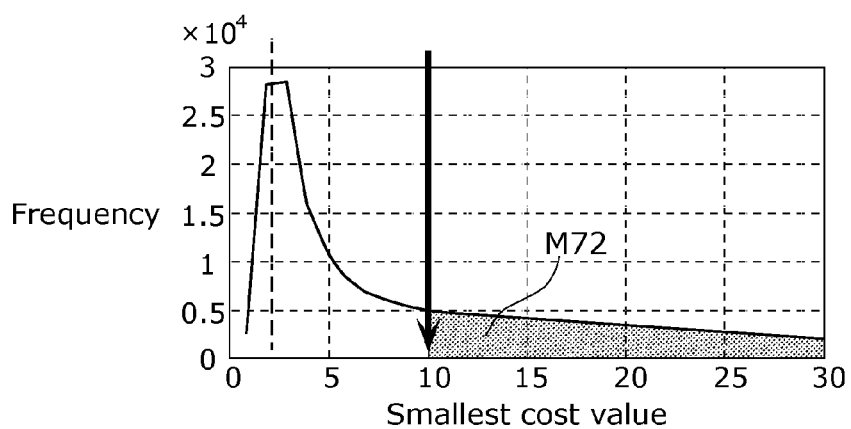
[FIG. 7C]

FIGS. 7A to 7C are each a diagram showing an example of the distribution of the smallest cost values of the cost function for the threshold (TH) calculation. FIGS. 7A to 7C each show the distribution of the smallest cost values for a single scene and each of the vertical axes corresponds to the number of pixels. FIG. 7A shows an example of the distribution of the smallest cost values in the scene of the static object. According to this example, the distribution contains the peak at the smallest cost value of about 2.5 and the tail ends at the smallest cost value of about 10. FIG. 7B shows an example of the distribution of the smallest cost values in the scene including the slight motion object. In the tail of the distribution, the high cost region M70 starts to be spread. The region indicates that the smallest cost value is high and the accuracy of the depth estimation is low and not reliable. FIG. 7C shows an example of the distribution of the smallest cost values in the scene including the large motion object. The tail of the distribution is longer and the high cost region M72 is generated. The high cost region M72 is longer than the high cost region M70, which matches the amount of object motion. Therefore, by analyzing the distribution, the threshold TH can be determined. This may be performed by offline calculation and on-the-fly calculation. The point is that the motion object region shows the low accuracy and unreliable depth estimation. This indication is used in inter-frame depth transfer and motion estimation/compensation for improving depth accuracy for the motion object region.

Moreover, the motion mask 326 is generated for every set of multi-focus images 226.

The motion mask 326, for example, shows the identified motion object region as white and the identified static object region as black as shown in FIG. 4. With this indication, the depth estimation apparatus 210 can know in which region the initial depth map 324 has low accuracy depth map.

Moreover, in the example of FIG. 4, the motion object region is included in the motion mask 326A of the set of multi-focus images SET 1, the motion mask 326B of the set of multi-focus images SET 2, and the motion mask 326D of the set of multi-focus images SET 3. However, the motion object region is not much included in the motion mask 326C of the set of multi-focus images SET 3. This means that the depth accuracy of the initial depth map 324 generated from the set of multi-focus images SET 3 is high. Therefore, the depth map of the set of multi-focus images SET 3 can be used to improve the depth maps for the set of multi-focus images SET 1, the set of multi-focus images SET 2, and the set of multi-focus images SET 4.

The following will describe a specific example of the feature tracking process (S104). The feature tracking process (object tracking process) is performed for knowing whether or not the same object exists in different sets of multi-focus images 226. Moreover, the feature tracking unit 302, for every set of multi-focus images 226, uses at least one image for the feature tracking. It should be noted that it is preferable that the images used from each of the sets of multi-focus images 226 have the same focal position. For example, the feature tracking unit 302 uses the image b in the set of (a, b, and c) or the set of (c, b, and a) shown in FIG. 4 for the feature tracking process. It should be noted that before the feature tracking is performed, the specific process may be applied to the image b. Moreover, when the AIF image is generated from the set of multi-focus images, it is preferable that the feature tracking process is performed using the AIF image.

Figure 8:
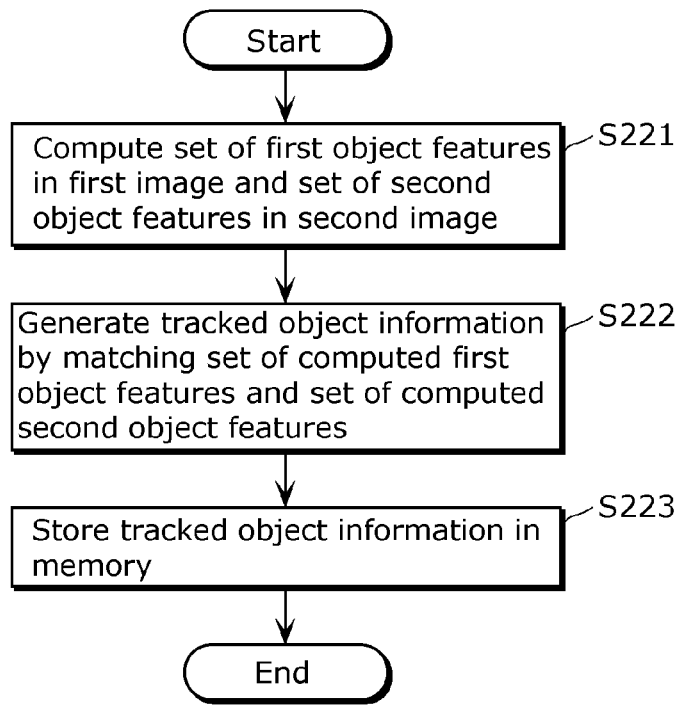
[FIG. 8]

FIG. 8 is a flowchart of the feature tracking method.

First, the feature tracking unit 302 computes a set of first object features of a first image included in a set of first multi-focus images and a set of second object features of a second image included in a set of second multi-focus images (S221). Next, the feature tracking unit 302 generates the tracked object information 322 by matching a set of the computed first object features and a set of the computed second object features (S222). The tracked object information 322 includes the information about the same object features that appeared in the different images. Finally, the feature tracking unit 302 stores the tracked object information 322 in a memory (not illustrated) (S223). With the tracked object information 322, it is possible to know where the same object in one image appears in another image. Therefore, the depth compensation unit 308 can accurately transfer the depth information between the depth maps using the tracked object information 322.

It should be noted that the known methods may be used as the feature tracking method. For example, the examples of the known feature tracking methods are disclosed in Non Patent Literature 5 and Non Patent Literature 6.

Figure 9:
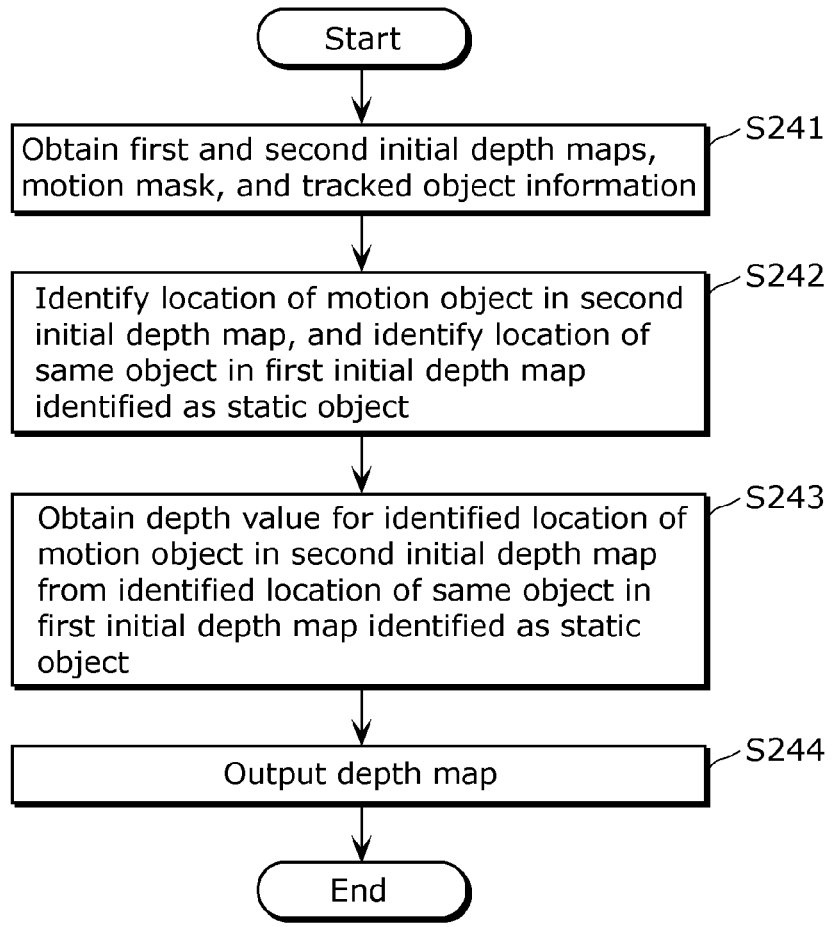
[FIG. 9]

Next, the compensation process for the depth map (S105) by the depth compensation unit 308 will be described. FIG. 9 is a flowchart of the compensation process for the depth map.

First, the depth compensation unit 308 obtains the first initial depth map corresponding to the set of first multi-focus images and the second initial depth map corresponding to the set of second multi-focus images, the first and second motion masks, and the tracked object information 322 (S241). Next, the depth compensation unit 308 identifies the location of the motion object region in the second initial depth map, using the second motion mask. Moreover, the depth compensation unit 308 identifies, using the tracked object information 322 and the first motion mask, the location of the same object in the first initial depth map that is identified as the static object region (S242).

The depth compensation unit 308 obtains the depth value for the identified location of the motion object region in the second initial depth map from the identified location of the same object in the first initial depth map that is identified as the static object region. In other words, the depth compensation unit 308 copies the depth value of the static object region to the motion object region. Finally, the depth compensation unit 308 outputs the compensated depth map 230.

As described above, the static object region has high depth accuracy and the motion object region has low depth accuracy. By transferring the high accuracy depth information from the static object region in the first depth map to the depth information of the object which is the same object but is in motion in the second depth map, the depth accuracy of the motion object region in the second depth map is improved. When the depth map 230 with the improved depth accuracy in the motion object region is used for the subsequent process, such as in 3D image generation, the quality of images generated by the processing units is improved.

It should be noted that the initial depth map 324 used by the depth compensation unit 308 for the compensation process is not limited to the initial depth map 324 of the previous frame. For example, the depth compensation unit 308 may use the initial depth map 324 of the subsequent frame. Moreover, the initial depth map 324 used by the depth compensation unit 308 for the compensation process is not limited to the initial depth map 324 just before or after the current frame. The initial depth map 324 may be the initial depth map 324 before or after two or more frames. Moreover, the depth compensation unit 308 may use the initial depth maps 324 of a plurality of frames. It should be noted that it is preferable that the depth compensation unit 308 compensates the depth information of the motion object region included in the initial depth map 324 in the scene to be processed, with the depth information of the static object region included in the scene that is temporally closest to the scene to be processed, among other scenes including the static object regions corresponding to the motion object region.

The following will describe the depth estimation process according to the present embodiment.

Figure 10A:
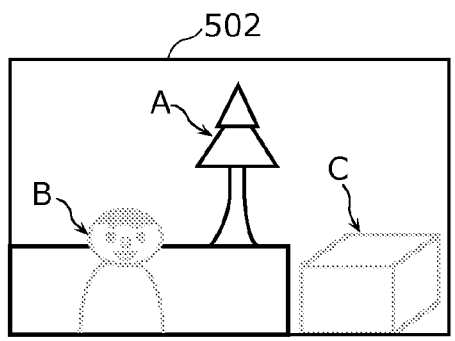
[FIG. 10A]
Figure 10B:
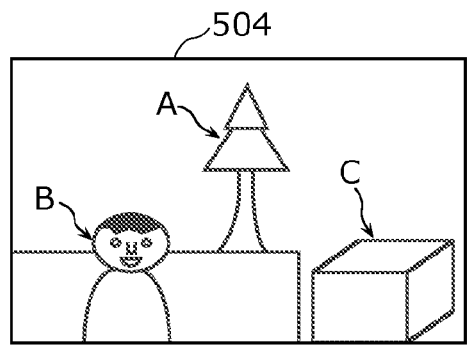
[FIG. 10B]
Figure 10C:
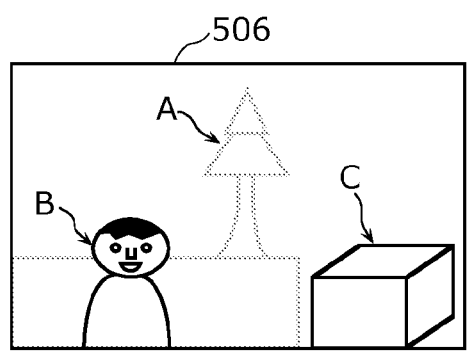
[FIG. 10C]
Figure 10D:
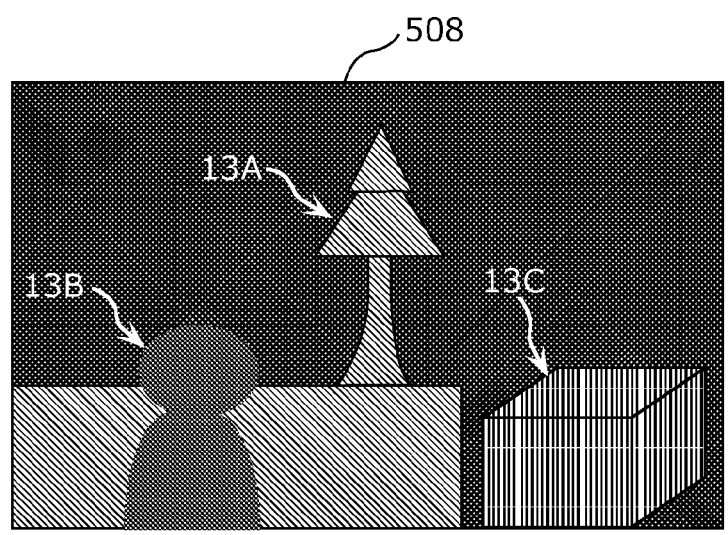
[FIG. 10D]

FIGS. 10A to 10C are each a diagram showing an example of the captured set of multi-focus images. In this example, three images are captured. They are a far-focused image 502, a sweep-focused image 504, and a near-focused image 506. In the far-focused image 502, the far object (object A) is in-focus and the near object (object C) is blurred due to out-of-focus. In the sweep-focused image 504, the objects A, B, and C have blur invariant effect. This means that the blur amounts in the objects A, B, and C are similar. These images are suitable for generating an AIF image. In the near-focused image 506, the near object (object C) is in-focus and the far object (object A) is blurred due to out-of-focus. These three images (502, 504, and 506) are used for depth estimation. In this example, the objects A, B, and C are static. Therefore, the estimated depth map has high depth accuracy. An example of the estimated depth map 508 according to these captured images is shown in FIG. 10D. As shown in FIG. 10D, the depth order of the object is accurately estimated.

Figure 11A:
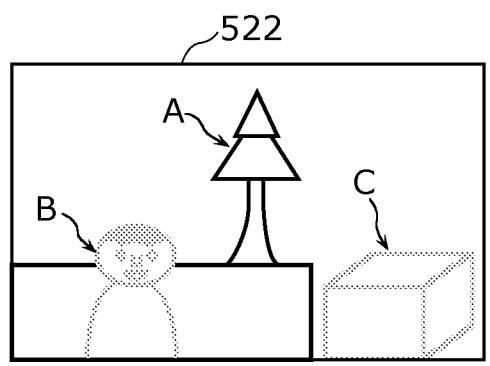
[FIG. 11A]
Figure 11B:
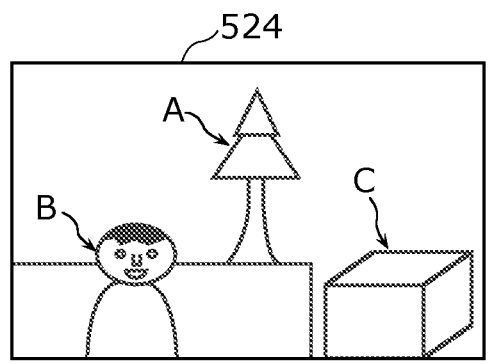
[FIG. 11B]
Figure 11C:
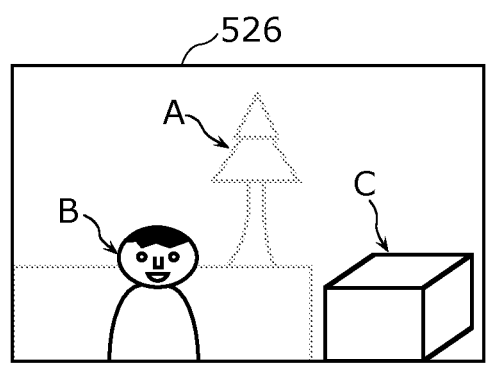
[FIG. 11C]
Figure 11D:
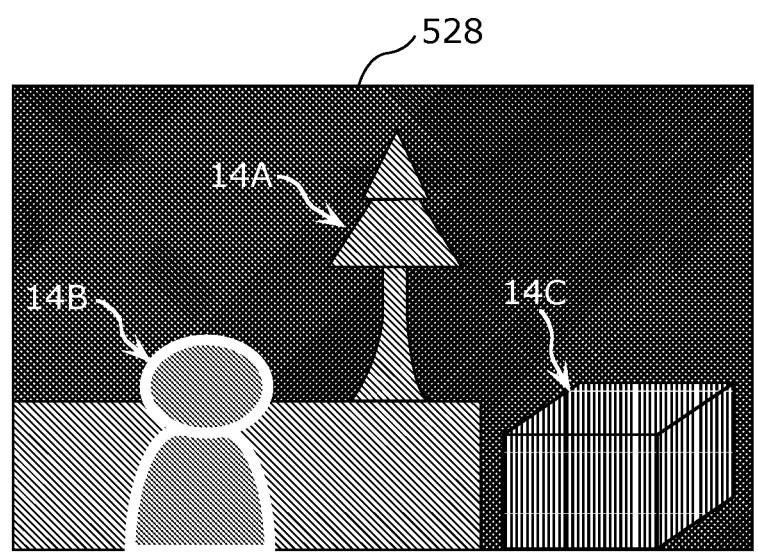
[FIG. 11D]

FIGS. 11A to 11C are each a diagram showing an example of the set of multi-focus images in which the subject in the scene is in motion. In this example, three images are captured as similarly to FIGS. 10A to 10C. They are a far-focused image 522, a sweep-focused image 524, and a near-focused image 526. In this example, the object B is moving from the left to the right. When three images are captured at different points of time, the object B is located at different pixel locations in each of the captured images. Therefore, the depth map 528 after the estimation is affected by the motion. As shown in FIG. 11D, the depth error occurs in the motion object region, and the depth order of the object B is inaccurate especially around the object boundary. When the depth map 528 is used for the subsequent process such as 3D image generation, the image quality of the motion object is degraded. Therefore, the improvement is needed.

Figure 12:
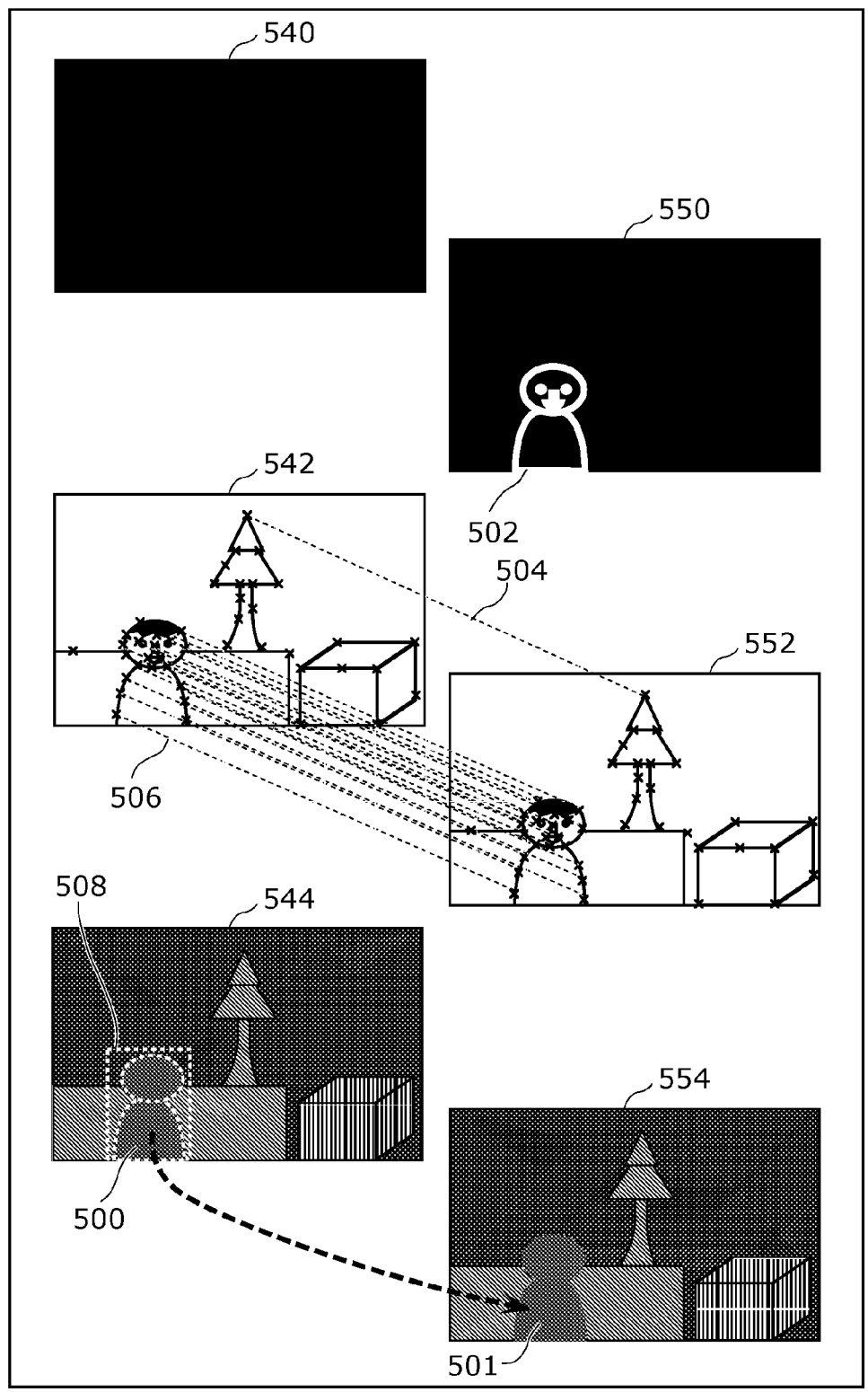
[FIG. 12]

FIG. 12 shows a flow of depth map improvement by the inter-frame depth transfer. As described above, the motion mask 326 is generated for every set of multi-focus images 226. In FIG. 12, a motion mask 540 represents the motion mask of the set of images with a static object (that is, the motion mask generated using the sets of multi-focus images in FIGS. 10A to 10C). A motion mask 550 represents the motion mask of the set of images with a motion object (that is, the motion mask generated using the sets of multi-focus images where the object B is in motion in FIGS. 11A to 11C).

The depth compensation unit 308 identifies a motion object region 502 indicated by the motion mask 540. Here, the depth accuracy of the motion object region 502 is low. The feature tracking unit 302 tracks the object between the images to know the location of the same object in the images captured at different points of time. More specifically, as shown in FIG. 12, the feature tracking unit 302 matches the feature of objects an image 542 and the feature of objects in an image 552. Here, with the information from the motion mask 550, the feature tracking unit 302 can know which feature or region belongs to the motion object region or the static object region. For example, since the matched feature 504 does not include the motion object region identified in the corresponding motion mask 550, the matched feature 504 is recognized as the feature of the static object. Moreover, since the matched feature 506 includes the motion object region identified in the motion mask 550, the matched feature 506 is recognized as the feature of the motion object. By using these pieces of information, the high accuracy depth information from the previous frame can be transferred to the current frame. For example, the depth information of the region 500 (static object region) in a depth map 544 is transferred to the depth information of the region 501 (motion object region) in a depth map 554. In this way, an inter-frame depth transfer can be performed only on the motion object region in the depth map 554.

It should be noted that the depth compensation unit 308 may perform the inter-frame transfer process using a region-based depth transfer method. For example, the depth compensation unit 308 transfers the depth information according to the shape of the object or on a block-by-block basis. Alternately, the depth compensation unit 308 may use a pixel-based depth transfer whereby the pixels around the identified motion object region is transferred. Moreover, the depth compensation unit 308 may use a feature-based depth transfer whereby only depth information of the key feature is transferred, and then use the depth compensation.

Moreover, the depth transfer process may be performed by replacement of the depth information from the previous frame to the current frame. Alternately, it can be performed using weighted average method.

Moreover, the depth compensation unit 308 may compute the depth value of the motion object region using the depth value of the static object, rather than directly copy the depth value of the static object region as the depth value of the motion object region. For example, the depth compensation unit 308 may determine, as the depth value of the motion object region, the value obtained by adding a predetermined coefficient to the depth value of the static object region or by multiplying the depth value of the static object region by a predetermined coefficient.

Figure 13:
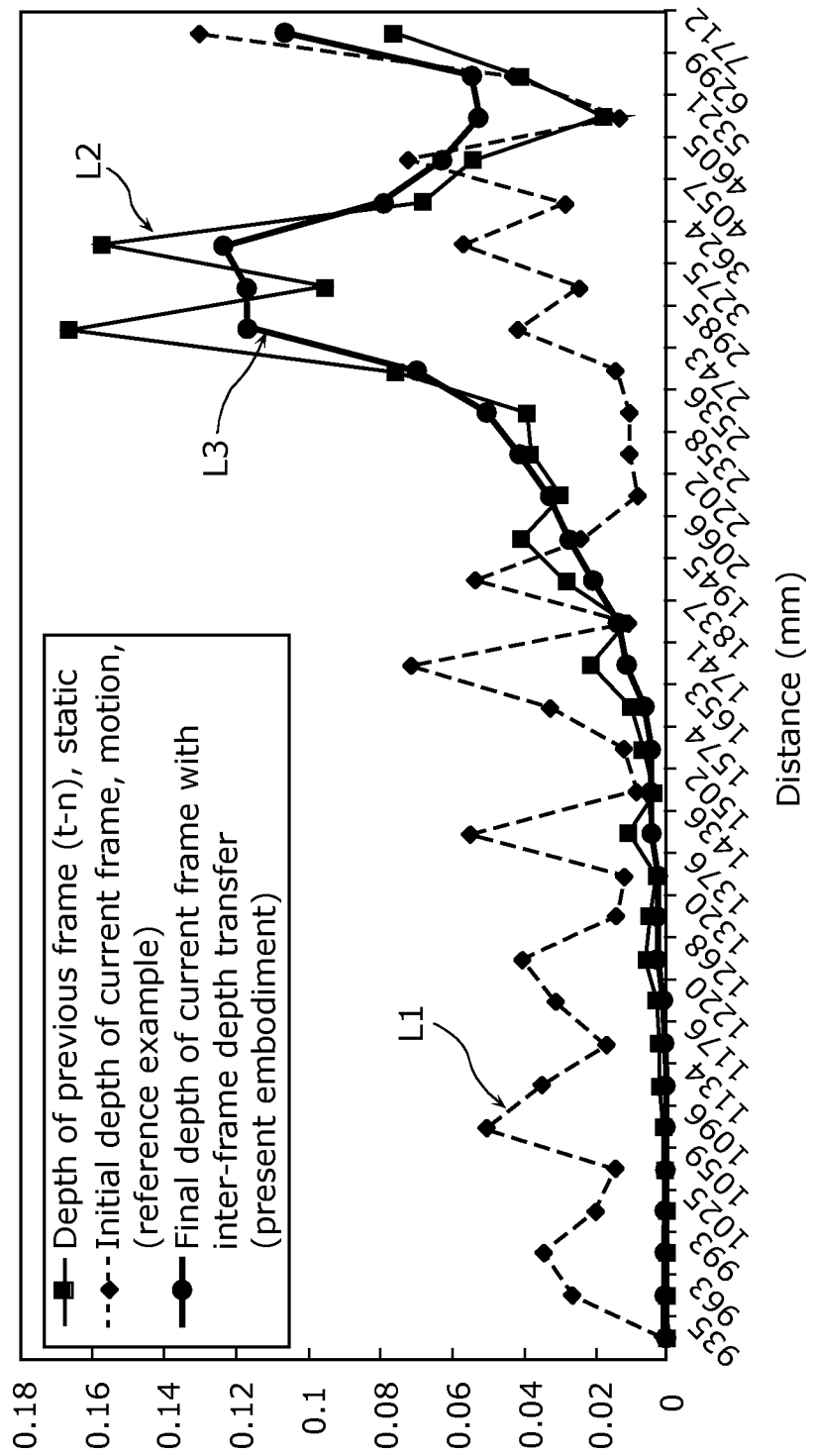
[FIG. 13]

FIG. 13 is a diagram showing an example of the histogram comparison result of the estimated depth map. In this example, the object is located at about 2.9 meters from the imaging apparatus. As can be seen from the result, the initial depth map of the current frame (histogram L1) is not accurate and includes many errors. This is because the object is in motion in the set of multi-focus images. A histogram L2 shows the depth map of the previous frame where there is no motion object. As can be seen from the figure, the depth accuracy of the histogram L2 is high. A histogram L3 shows the depth map which is compensated by the transfer of the depth information from the depth map of the previous frame. As can be seen from the figure, the depth accuracy of the compensated depth map is significantly improved. From the result, the effectiveness of the present embodiment is verified.

The following will describe a modification example of the above described present embodiment.

Figure 14:
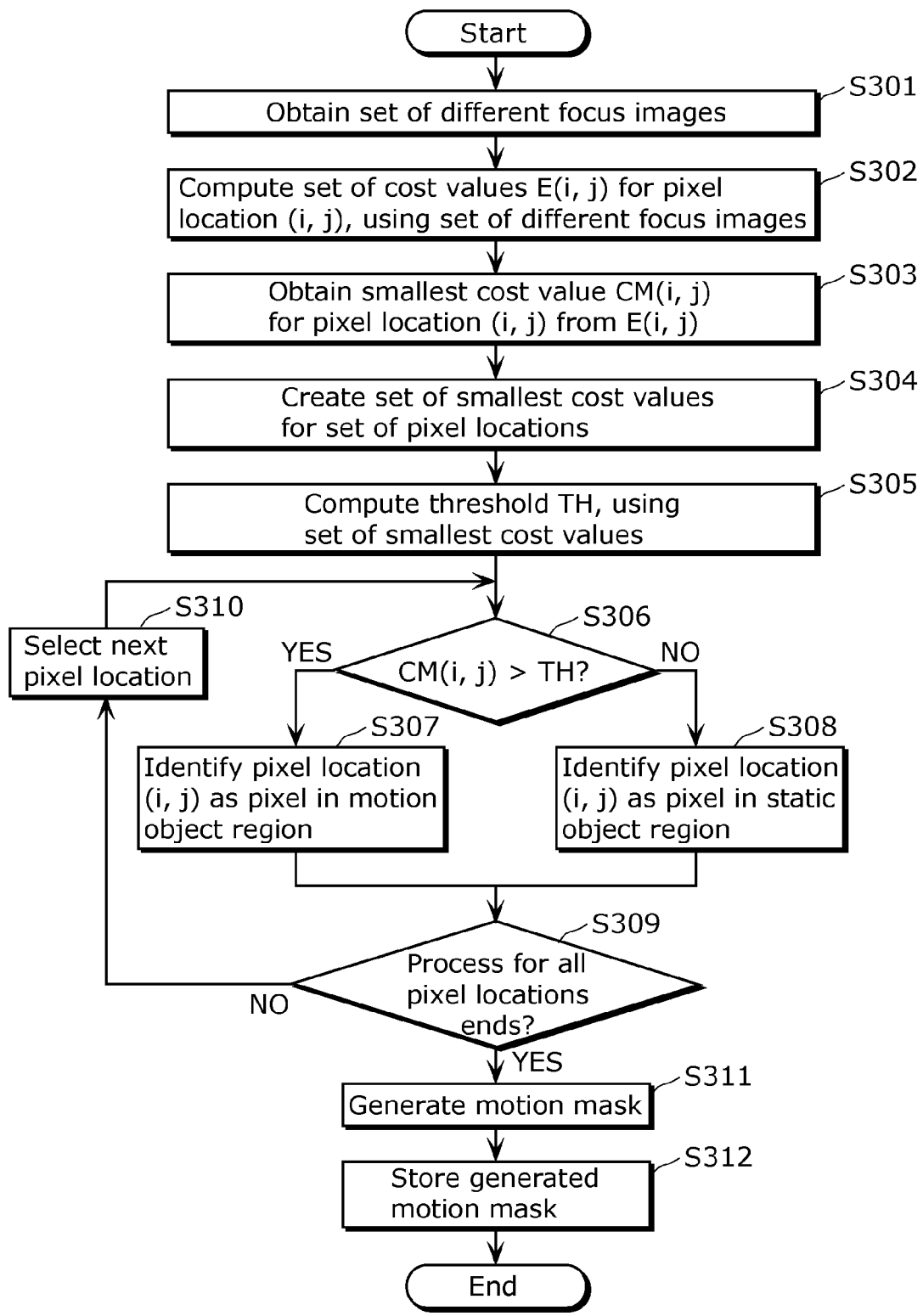
[FIG. 14]

FIG. 14 is a flowchart of the motion estimation process according to another embodiment of the present invention.

First, the depth estimation apparatus 210 obtains the set of multi-focus images 226 (S301). Next, the cost value computing unit 305 computes a set of cost values E (i, j) for a pixel location (i, j) using the set of multi-focus images 226 (S302). Next, the cost value computing unit 305 selects the smallest cost value CM (i, j) for the pixel location (i, j) from E (i, j) (S303). Next, the motion estimation unit 306, for example, generates a set of smallest cost values that are the smallest cost values for the pixel locations included in a frame (S304).

Next, the motion estimation unit 306 generates a threshold TH using the set of the smallest cost values (S305). Next, the motion estimation unit 306 determines whether or not CM (i, j) is greater than a threshold TH (S306). When CM (i, j) is greater than the threshold (YES in S306), the motion estimation unit 306 identifies the pixel location (i, j) as a pixel location in the motion object region (S307). When CM (i, j) is not greater than the threshold (No in S306), the motion estimation unit 306 identifies the pixel location (i, j) as a pixel location in the static object region (S308). When the process of Steps S306 to S308 is not completed for all the pixel locations (NO in S309), the motion estimation unit 306 selects the next pixel location (S310) and the process of Step S306 and the following steps is performed on the selected pixel. Moreover, when the process is completed for all the pixel locations (YES in S309), the motion estimation unit 306 generates the motion mask 326 (S311). Finally, the motion estimation unit 306 stores the generated motion mask 326 in a memory (not illustrated) (S312).

It should be noted that the generated motion mask 326 may be used to indicate the accuracy of the depth map obtained from the set of multi-focus images. Moreover, the generated motion mask 326 may be also used for other subsequent process, depending on the application.

Moreover, the above description shows an example of where the motion estimation apparatus 300 performs motion estimation on the motion of the pixel for each pixel. However, the motion estimation apparatus 300 may perform estimation on the motion for each region including a plurality of pixels. Similarly, the depth map generation unit 304 may generate the depth map showing the depth of the region for each region including a plurality of pixels. Similarly, the depth compensation unit 308 may compensate the depth information of the region for each region including a plurality of pixels. Moreover, the size of the region used by the processing units may be the same or different from each other.

[Embodiment 2]

The present embodiment will describe a modification example of the depth estimation apparatus 210 according to the above described Embodiment 1. It should be noted that hereafter, the difference from Embodiment 1 will be mainly described and the overlapping description will be omitted.

Figure 15:
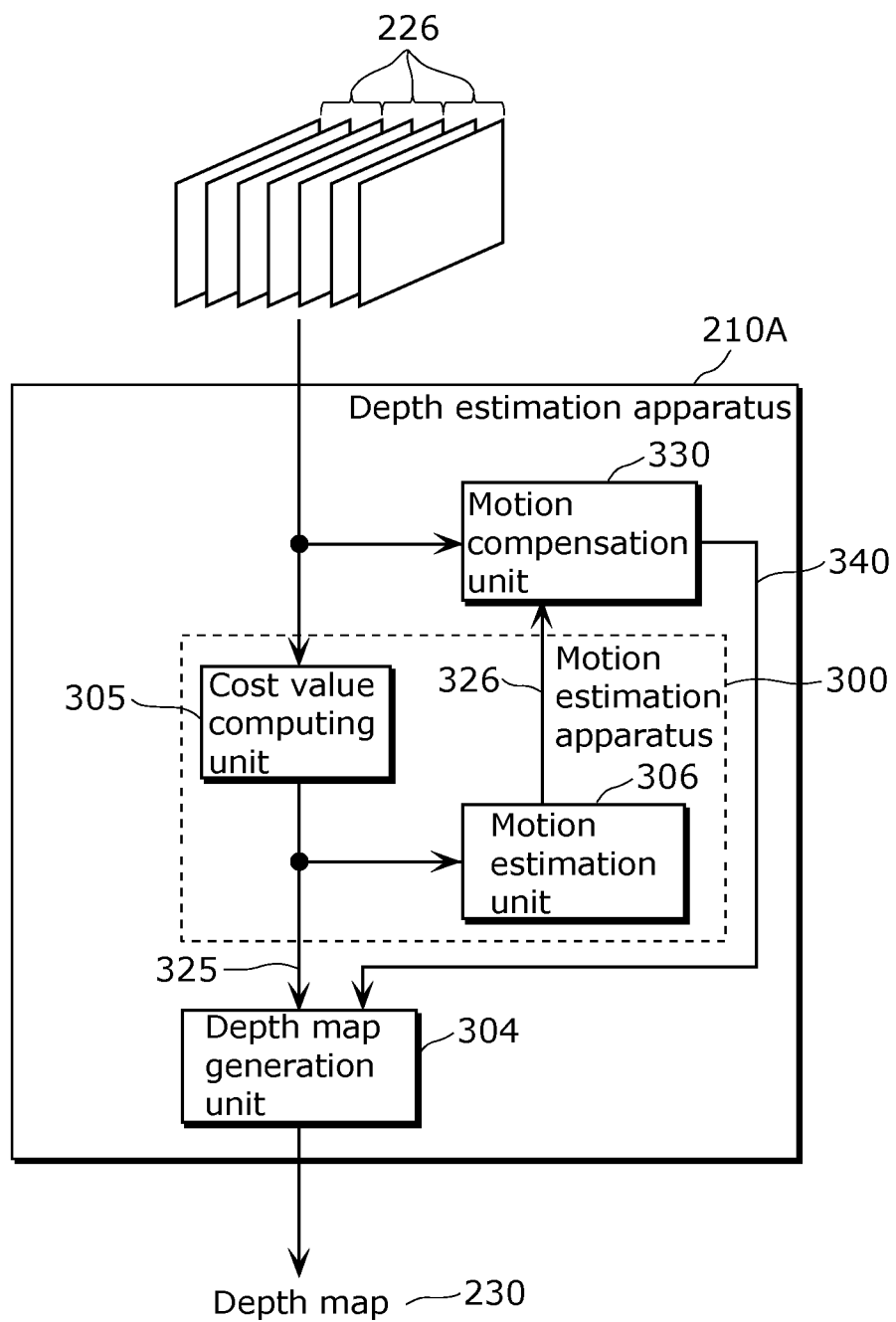
[FIG. 15]

FIG. 15 is a block diagram of a depth estimation apparatus 210A according to Embodiment 2 of the present invention. The depth estimation apparatus 210A inputs the set of multi-focus images 226. The depth estimation apparatus 210A includes a motion estimation apparatus 300, a depth map generation unit 304, and a motion compensation unit 330.

The motion compensation unit 330 computes the motion vector of the set of multi-focus images 226 from the motion object region identified by the motion estimation unit 306, and compensates the pixel position for the motion object to reduce a pixel shift using the computed motion vector. The motion compensation information 340 that is the motion compensated output information is transmitted to the depth map generation unit 304, and is used for improving the depth accuracy of the motion object. For example, the depth map generation unit 304 performs motion compensation on the set of multi-focus images 226 using the motion vector computed by the motion compensation unit 330 or the motion compensation information 340, and generates the depth map 230 using the set of multi-focus images after the motion compensation.

By doing so, the depth accuracy of the motion object is improved with the depth accuracy of the static object being maintained. Furthermore, the complexity of the motion estimation and the motion compensation can be reduced since the motion estimation and the motion compensation are performed only on the motion object region.

Figure 16:
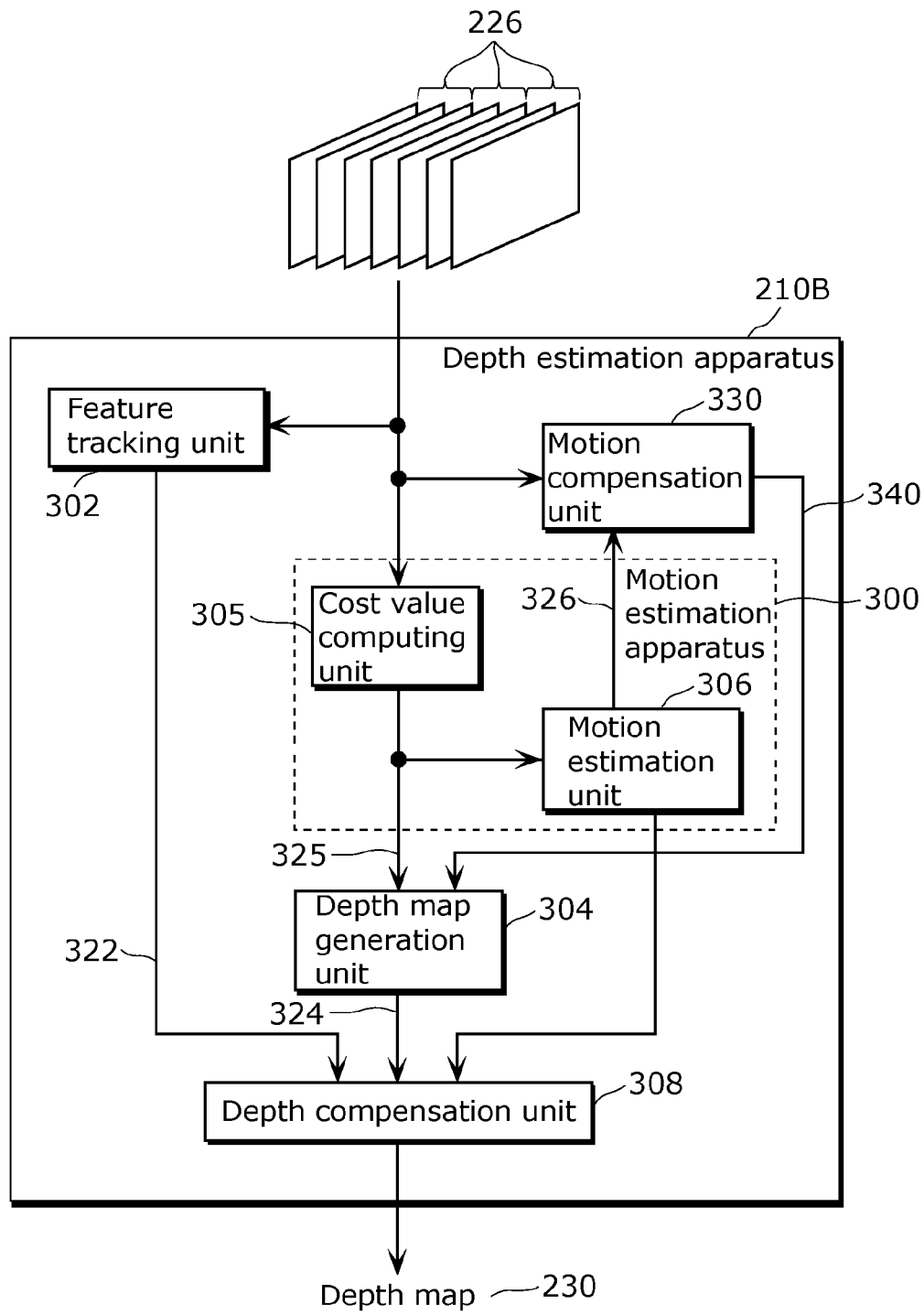
[FIG. 16]

It should be noted that like a depth estimation apparatus 210B shown in FIG. 16, it is possible to combine the depth estimation apparatus 210 shown in FIG. 3 with the depth estimation apparatus 210A shown in FIG. 15. In other words, the depth map generation unit 304 performs motion compensation on the set of multi-focus images 226 using the motion vector computed by the motion compensation unit 330 or the motion compensation information 340, and may generate the initial depth map 324 using the set of multi-focus images after the motion compensation.

[Embodiment 3]

The present embodiment will describe an imaging apparatus including the above described depth estimation apparatus 210.

Figure 17:
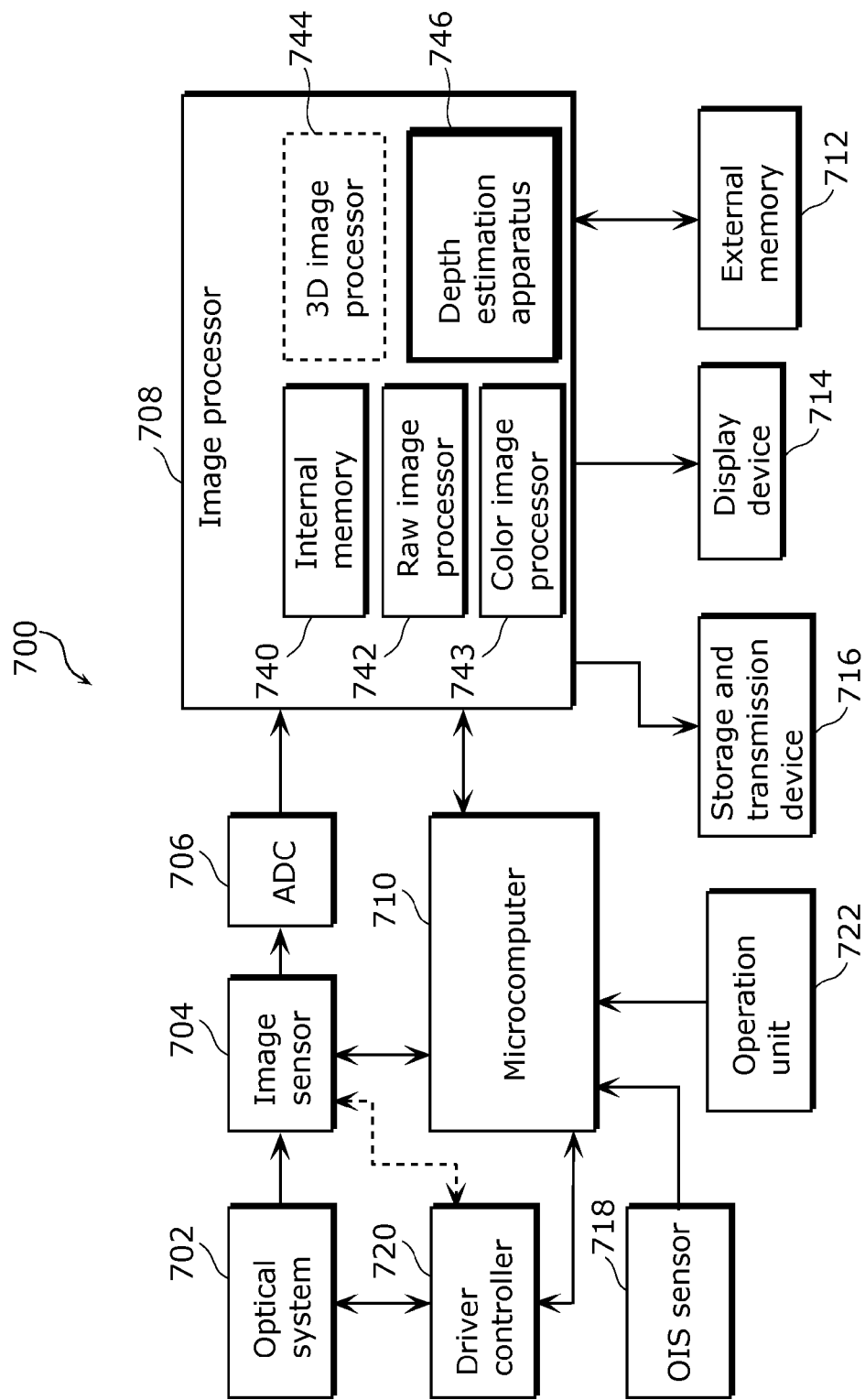
[FIG. 17]

FIG. 17 is a block diagram of an imaging apparatus 700 according to the present embodiment. The imaging apparatus 700 includes an optical system 702, an image sensor 704, an Analog-to-Digital Converter (ADC) 706, an image processor 708, a microcomputer 710, an external memory 712, a driver controller 720, an Optical Image Stabilizer (OIS) sensor 718, an operation unit 722, a storage and transmission device 716, and a display device 714.

The image processor 708 includes an internal memory 740, a depth estimation apparatus 746, a raw image processor 742, a color image processor 743, and a 3D image processor 744 which is an option. It should be noted that the imaging apparatus 700 may further include other components such as a microphone and a speaker.

The optical system 702 is composed of components for controlling light signal reaching the image sensor 704. For example, the optical system 702 includes a lens or a set of lenses, a zoom and focus mechanism, an actuator, a shutter, and an aperture.

The image sensor 704 accumulates incident light signal and converts the light signal into an electrical signal. Moreover, the image sensor 704 is directed from the microcomputer 710. The converted electrical signal is converted into digital data (war image data) by the ADC 706, and the digital data is stored in the internal memory 740 or the external memory 712. The raw image data includes the set of multi-focus images whereas each image is captured at a different focal position. Furthermore, the raw image data may include high resolution image data which is complex raw image data captured while the focal position is being changed during image capture.

The raw image processor 742 obtains the raw image data from the internal memory 740 (or the external memory 712) and then performs a variety of pre-processing such as resizing, linearity correction, white balance, gamma correction, and so on, on the obtained raw image data. The pre-processed raw image data is stored or transferred by the storage and transmission device 716. The pre-processed raw image may be performed by the color image processor 743 to generate a color image such as RGB or YCbCr. The color image processor 743 may perform color interpolation, color correction, tonal range adjustment, color noise reduction, and so on, for generating a favorable color image.

The depth estimation apparatus 746 is the above described depth estimation apparatus 210, 210A, or 210B, inputs the pre-captured images having different focuses, and then generates the depth map. It should be noted that the depth map may be used in the further processing units such as the 3D image processor 744 for 3D image generation. Moreover, the depth map may be used for visualization to view on the display device 714. Moreover, the depth map may be stored or transferred by the storage and transmission device 716 for further use. Examples of the storage device include but are not limited to a flash-based memory card, a hard disk drive, and an optical drive. Examples of the transmission device include but are not limited to an HDMI interface, a USB interface, a wireless interface, and a direct-to-printer interface. The storage or transmission device may optionally include a lossless compression unit or a lossy compression unit.

The optical system 702 is controlled by the driver controller 720 which is directed by the microcomputer 710. The operation unit 722 receives the input of user operation and sends the electrical signal to the microcomputer 710, to direct the related processing units, such as the driver controller 720, the image sensor 704, the image processor 708, and the like.

The OIS sensor 718 detects the motion due to hand tremor or camera motion and sends the electrical signal to the microcomputer 710. The microcomputer 710 directs the driver controller 720 to control the actuator or the like of the optical system 702 for moving a lens to compensate motion. With this, blur effect caused by hand tremor and camera motion can be reduced.

The image processor 708, the depth estimation apparatus 746, and the internal module are typically implemented in the form of Integrated Circuits (IC), Application-Specific Integrated Circuits (ASIC), or Large Scale Integrated circuits (LSI). Each of the processing units can be in many single-function LSIs, or can be in one integrated LSI. The name used here is LSI, but it may also called IC, system LSI, super LSI, or ultra LSI depending on the degree of integration. Moreover, ways to achieve integration may be achieved by not only LSI but also special circuit or general purpose processor. This includes a specialized microprocessor such as Digital Signal Processor that can be directed by program instruction Field Programmable Gate Array (FPGA) that can be programmed after manufacturing LSI or reconfigurable processor that can reconfigure the connection or configuration of LSI can be used for the same purpose. In the future, with the advancement in manufacturing and process technology, a brand-new technology may replace LSI. The integration can be performed by using the technology.

The motion estimation apparatus, the depth estimation apparatus, and the imaging apparatus according to the embodiments of the present invention have been described, but the present invention is not intended to be defined by the embodiments.

Moreover, a part or all of the functions of the motion estimation apparatus, the depth estimation apparatus, or the imaging apparatus may be implemented by a processor such as a CPU.

Furthermore, the present invention may be the above described program, and a non-transitory computer-readable recording medium on which the above described program is recorded. Moreover, it goes without saying that the above described program can be distributed via a transmission medium such as the Internet.

In other words, in each of the above described embodiments, each of the constituent elements may be configured by implementing dedicated hardware or a software program suitable for each of the constituent elements. Each of the constituent elements may be realized by the reading, by the program executing unit such as a CPU and a processor, of the software program on which a recording medium such as a hard disk or a semiconductor memory is recorded. It should be noted that the software realizing the motion estimation apparatus according to each of the above described embodiments is the following program.

In other words, the program is a program estimating, using a set of multi-focus images which correspond to a single scene and have different focuses, motion for each of first regions included in the scene, the program causing a computer to execute: computing, using the set of multi-focus images, for each of the first regions, a cost value indicating a difference between a blur amount of the first region and a standard blur amount determined for each of distances in a depth direction; and estimating, using the cost value, the motion of the first region corresponding to the cost value.

Moreover, the motion estimation apparatus, the depth estimation apparatus, and the imaging apparatus according to the above described embodiments and a part or all of the functions of modification examples thereof may be combined.

Moreover, the numerical values in the above description are used for specifically describing the present invention. Therefore, the present invention is not defined only by the exemplified numeral values.

Moreover, the division of the functional blocks in the block diagram is mere example. It is acceptable for a plurality of functional blocks to be implemented as a functional block or for the one functional block to be divided into a plurality of functional blocks, and for a part of the function to be transferred to another functional block. Moreover, the functions of the functional blocks having similar functions may be processed in parallel or in a time-sharing manner by a single piece of hardware or software.

Moreover, a sequence of the steps included in the above described method (process) has an aim to exemplify for specifically describing the present invention. Therefore, the sequence other than the above described sequence is acceptable. Moreover, a part of the steps and another step may be implemented simultaneously or in parallel.

Furthermore, the modification examples of the present embodiments within the scope of modifications conceived by those skilled in the art are included in the present invention without materially departing from the spirit of the present invention.

[Industrial Applicability]

The present invention can be applied to a motion estimation apparatus and a depth map estimation apparatus using the motion estimation apparatus. Moreover, the present invention can be applied to an imaging apparatus including the depth map estimation apparatus, or the like.

[Reference Signs List]
200 Imaging apparatus
202 Optical system
204 Image capturing unit
206 Pre-processing unit
208 Internal memory
210, 210A, 210B Depth estimation apparatus
212 Controller
214 External memory
224, 226 Set of multi-focus images
230 Depth map
300 Motion estimation apparatus
302 Feature tracking unit
304 Depth map generation unit
305 Cost value computing unit
306 Motion estimation unit
308 Depth compensation unit
322 Tracked object information
324 Initial depth map
325 Smallest cost value
326, 326A, 326B, 326C, 326D Motion mask
330 Motion compensation unit
340 Motion compensation information
502, 522 Far-focused image
504, 524 Sweep-focused image
506, 526 Near-focused image
508, 528 Depth map
540, 550 Motion mask
542,552 Image
544, 554 Depth map
700 Imaging apparatus
702 Optical system
704 Image sensor
706 ADC
708 Image processor
710 Microcomputer
712 External memory
714 Display device
716 Storage and transmission device
718 OIS sensor
720 Driver controller
722 Operation unit
740 Internal memory
742 Raw image processor
743 Color image processor
744 3D image processor
746 Motion estimation apparatus

The invention claimed is:

1. A depth estimation apparatus for generating, for each of plural scenes, a depth map using a set of multi-focus images which correspond to the scene and have different focuses, the depth map showing a depth for each of first regions included in the scene, the depth estimation apparatus comprising:
a processor; and
a non-transitory computer-readable medium having stored thereon a program that, when executed by said processor, causes said depth estimation apparatus to function as:
a cost value computing unit configured to compute, for each of the scenes, a cost value for each of the first regions using the set of multi-focus images corresponding to the scene, the cost value of each first region indicating a difference between a blur amount corresponding to the respective first region and a standard blur amount determined for each of distances in a depth direction;

a depth map generation unit configured to generate an initial depth map that is a depth map of the scene by estimating a depth of at least one of the first regions based on the cost value of the respective at least one first region;

a motion estimation unit configured to estimate the motion of the at least one first region based on the cost value of the respective first region computed by said cost value computing unit; and a depth compensation unit configured to compensate, based on the estimated motion of the at least one first region, depth information included in the initial depth map of a scene to be processed, with depth information included in another scene.

2. The depth estimation apparatus according to claim 1, wherein the cost value computing unit is configured to compute a smallest cost value among cost values determined for plural first regions for one of the distances in the depth direction, and the motion estimation unit is configured to estimate, based on the smallest cost value, the motion of the first region having the smallest cost value.

3. The depth estimation apparatus according to claim 2, wherein the motion estimation unit is configured to:

determine that the first region having the smallest cost value is a motion object region that is in motion when the smallest cost value is greater than a threshold; and determine that the first region having the smallest cost value is a static object region that is not in motion when the smallest cost value is smaller than the threshold.

4. The depth estimation apparatus according to claim 3, wherein the threshold is a predetermined fixed value.

5. The depth estimation apparatus according to claim 3, wherein the depth compensation unit is configured to copy the depth information of the static object region to the depth information of the motion object region.

6. The depth estimation apparatus according to claim 3, wherein the depth compensation unit is configured to compensate the depth information of the motion object region included in the initial depth map of the scene to be processed, with depth information of the static object region included in a scene which is temporally closest to the scene to be processed, among other scenes including the static object region corresponding to the motion object region.

7. The depth estimation apparatus according to claim 3, wherein the depth compensation unit is configured to compensate, for each pixel, the depth information of the motion object region included in the initial depth map of the scene to be processed, with the depth information of the static object region included in the other scene and corresponding to the motion object region.

8. The depth estimation apparatus according to claim 3, wherein the depth compensation unit is configured to compensate, for each region including pixels, the depth information of the motion object region included in the initial depth map of the scene to be processed, with the depth information of the static object region included in the other scene and corresponding to the motion object region.

9. The depth estimation apparatus according to claim 3, wherein the program, when executed by said processor, further causes said depth estimation apparatus to function as a feature tracking unit configured to track an object between scenes, to generate tracked object information showing a same object in the scenes, wherein the depth compensation unit is configured to identify, using the tracked object information, the static object region included in the other scene and corresponding to the motion object region.

10. The depth estimation apparatus according to claim 9, wherein the feature tracking unit is configured to;

compute a set of first object features in at least one first image that is included in a set of first multi-focus images;

compute a set of second object features in at least one second image that is included in a set of second multi-focus images and has a focus identical to a focus of the first image, and generate the tracked object information by matching the set of first object features and the set of second object features.

11. The depth estimation apparatus according to claim 3, wherein the program, when executed by said processor, further causes said depth estimation apparatus to function as a motion compensation unit configured to compute a motion vector of the motion object region, using the set of multi-focus images, wherein the depth map generation unit is configured to perform motion compensation on the set of multi-focus images using the motion vector, and generate the initial depth map using a set of multi-focus images resulting from the motion compensation.

12. The depth estimation apparatus according to claim 3, wherein the program, when executed by said processor, further causes said depth estimation apparatus to function as a motion compensation unit configured to compute a motion vector of the motion object region, using the set of multi-focus images; and the depth map generation unit is configured to perform motion compensation on the set of multi-focus images using the motion vector, and generate a depth map of a corresponding scene using a set of multi-focus images resulting from the motion compensation.

13. A depth estimation method for generating, for each of plural scenes, a depth map using a set of multi-focus images which correspond to the scene and have different focuses, the depth map showing a depth for each of first regions included in the scene, the depth estimation method comprising:

computing, for each of the scenes, a cost value for each of the first regions using the set of multi-focus images corresponding to the scene, the cost value of each first region indicating a difference between a blur amount of the respective first region and a standard blur amount determined for each of distances in a depth direction;

generating an initial depth map that is a depth map of the scene by estimating a depth of at least one of the first regions based on the cost value of the respective at least one first region;

estimating the motion of the at least one first region based on the cost value of the respective first region; and compensating, based on the estimated motion of the at least one first region, depth information included in the initial depth map of a scene to be processed, with depth information included in another scene.

14. A non-transitory computer-readable recording medium having a program recorded thereon for causing a computer to execute the depth estimation method according to claim 13.

15. An integrated circuit for generating, for each of plural scenes, a depth map using a set of multi-focus images which correspond to the scene and have different focuses, the depth map showing a depth for each of first regions included in the scene, the integrated circuit comprising:

a cost value computing circuit configured to compute, for each of the scenes, a cost value for each of the first regions using the set of multi-focus images corresponding to the scene, the cost value of each first region indicating a difference between a blur amount corresponding to the respective first region and a standard blur amount determined for each of distances in a depth direction;

a depth map generation circuit configured to generate an initial depth map that is a depth map of the scene by estimating a depth of at least one of the first regions based on the cost value of the respective at least one first region;

a motion estimation circuit configured to estimate the motion of the at least one first region based on the cost value of the respective first region computed by said cost value computing circuit: and a depth compensation circuit configured to compensate, based on the estimated motion of the at least one first region, depth information included in the initial depth map of a scene to be processed, with depth information included in another scene.

16. The integrated circuit according to claim 15, wherein the cost value computing circuit is configured to compute a smallest cost value among cost values determined for plural first regions for one of the distances in the depth direction, and the motion estimation circuit is configured to estimate, based on the smallest cost value, the motion of the first region having the smallest cost value.

17. The integrated circuit according to claim 16, wherein the motion estimation circuit is configured to:

determine that the first region corresponding to the smallest cost value is a motion object region that is in motion when the smallest cost value is greater than a threshold; and determine that the first region corresponding to the smallest cost value is a static object region that is not in motion when the smallest cost value is smaller than the threshold.

18. The depth estimation apparatus according to claim 15, further comprising:

a motion compensation circuit, implemented as an integrated circuit, configured to compute a motion vector of the motion object region, using the set of multi-focus images;

wherein the depth map generation circuit, implemented as an integrated circuit, is configured to perform motion compensation on the set of multi-focus images using the motion vector, and generate a depth map of a corresponding scene using a set of multi-focus images resulting from the motion compensation.

* * * * *